US008557478B2

(12) United States Patent
Homma

(10) Patent No.: US 8,557,478 B2
(45) Date of Patent: Oct. 15, 2013

(54) FUEL CELL

(75) Inventor: Hiroki Homma, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 638 days.

(21) Appl. No.: 12/376,728

(22) PCT Filed: Jul. 9, 2007

(86) PCT No.: PCT/JP2007/064038
§ 371 (c)(1),
(2), (4) Date: Feb. 6, 2009

(87) PCT Pub. No.: WO2008/018267
PCT Pub. Date: Feb. 14, 2008

(65) Prior Publication Data
US 2009/0325035 A1 Dec. 31, 2009

(30) Foreign Application Priority Data
Aug. 9, 2006 (JP) ................................ 2006-217015

(51) Int. Cl.
*H01M 8/02* (2006.01)
*H01M 8/04* (2006.01)
*H01M 8/22* (2006.01)
*H01M 8/24* (2006.01)

(52) U.S. Cl.
USPC ........... 429/508; 429/444; 429/456; 429/462; 429/505

(58) Field of Classification Search
USPC ........... 429/34, 38, 30, 32, 40, 410, 442, 444, 429/414, 506; 210/429
See application file for complete search history.

(56) References Cited

U.S. PATENT DOCUMENTS 6,409,785 B1 * 6/2002 Smithies et al. ................ 55/486
2001/0019790 A1 * 9/2001 Regan et al. .................... 429/35
2002/0150806 A1 * 10/2002 Stenersen et al. .............. 429/34
2004/0023096 A1 * 2/2004 Pratt et al. ...................... 429/34
2004/0108151 A1 * 6/2004 Guidry et al. ............... 180/65.3
2004/0175600 A1 * 9/2004 Arthur et al. .................... 429/17

(Continued)

FOREIGN PATENT DOCUMENTS

JP 10-172594 6/1998
JP 2005-174884 6/2005

(Continued)

OTHER PUBLICATIONS

CPL Carbon Link, "Properties of Activated Carbon", Wigan, United Kingdom.*

(Continued)

*Primary Examiner* — Kenneth Douyette
(74) *Attorney, Agent, or Firm* — Nelson Mullins Riley & Scarborough LLP; Anthony A. Laurentano

(57) ABSTRACT

A flow path member includes an orifice section, a pressure regulating section, a filter section, and a distribution section joined together integrally, and these components are detachably provided between insulating seals. In the orifice section, orifice holes are formed around a fuel gas supply passage. In the pressure regulating section, a substantially ring shaped pressure regulating chamber is formed. In the filter section, a plurality of filter holes are formed. The orifice holes and the filter holes are connected through the pressure regulating chamber. In the distribution section, a plurality of distribution grooves for distributing the fuel gas flowing through the fuel gas supply passage in a stacking direction to flow along a separator surface, and a circular groove for supplying the fuel gas to the filter section are formed.

24 Claims, 22 Drawing Sheets

(56) References Cited

U.S. PATENT DOCUMENTS

| | | | | |
|---|---|---|---|---|
| 2005/0064261 | A1* | 3/2005 | Breault et al. | 429/32 |
| 2005/0118491 | A1* | 6/2005 | Ramsey et al. | 429/39 |
| 2005/0142424 | A1 | 6/2005 | Homma et al. | |
| 2005/0164059 | A1* | 7/2005 | Yang et al. | 429/26 |
| 2006/0141332 | A1* | 6/2006 | Cortright et al. | 429/38 |

FOREIGN PATENT DOCUMENTS

| | | | |
|---|---|---|---|
| JP | 2005-209619 | | 8/2005 |
| JP | 2005-209621 | | 8/2005 |
| WO | WO-2006/049308 | A2 | 5/2006 |
| WO | WO-2006/070932 | A1 | 7/2006 |

OTHER PUBLICATIONS

Rutz et al., "The Effect of Microstructure on Fatigue Properties of High Density Ferrous P/M Materials", PM-EC World Congress, Jun. 16-21, 1996, Washington, D.C.*

International Search Report for Application No. PCT/JP2007/064038, dated Feb. 29, 2008.

* cited by examiner 10
28
78
26
22
20
24
A
36
B
88
38
77
78
28
36a
36b
30
34
74
32
76
76a
(46)
42
75
B
40
70
60
44
30
62
64
66
72
72a 36
38
30
34
32
74
58
75
70
B
B
58
26
22
20
24
46
B
38
30
60
56
54
FUEL GAS
OXYGEN-CONTAINING GAS 10
28
75
56
70
42
40
36
72
38
72a
22
20
24
26
44
60
34
74
78
86
84
82
80
76
32
79
77
46
86b
86a
84a
82a
80a
76a
66
30
A
B
OXYGEN-CONTAINING GAS
FUEL GAS 100
102
75
102
70
42
54
36
38
70
104
40
38
A
B
44
34
78
32
79
46
77
76
86
84
82
80
78
74
60
66
30
22
20
24
26
OXYGEN-CONTAINING GAS
FUEL GAS 106
107
46
78
196
26
22
20
24
A
36
B
107
78
36a
72
72
77
88
36b
30
34
32
74
76
76a
(46)
75
B
46
60
44
30
62
64
66

106
107
75
107
70
70
104
40
54
36a
38
38
72
22
20
24
26
44
34
60
74
78
32
78
86
84
82
80
79
46
77
76
66
30
A
B
OXYGEN-CONTAINING GAS
FUEL GAS 108
109
26
22
20
24
A
88
78
60
77
30
34
64
38
76
76a
(46)
62
44
36
109
B
36a
36b
30
34
74
32
42
75
B
40
70

108
109
75
109
70
70
42
104
54
40
36a
38
38
22
20
24
26
44
60
78
34
74
78
86
84
82
80
76
32
79
77
46
86a
77
86b
84a
82a
80a
76a
66
30
A
B
OXYGEN-CONTAINING GAS
FUEL GAS

110
OXYGEN-CONTAINING GAS
FUEL GAS
A
B
77
168
160
135
74
78a
86
84
82
80
76
162
75
140
130
70
40
42
142
38
158
138
22
20
24
26
114
118
120
116
78
32
156
166
124
154
30

182
180
78
242b
242a
74
248
250
30
244
246
248
250
A
OXYGEN-CONTAINING GAS
FUEL GAS
EXHAUST GAS 180
22
20
24
26
198
30
38
194
186
202
200
40
196
192
184
230
36
74
A
62
232
78
30
229
188
224
224a
224b
220
218
216
222
68
74
226
230
228
78
74
208
190b
212
206
214
210
190a
212
210
142
74
208
206
26
78
77
88
77
78a
88
240
184
78a
88
238
77

180
184
186
188
190a (b)
138
162
142
42
70
140
78a
240
77
232
208
77
74
B
A
86
84
82
80
76
78a
75
162
200
224b
226
40
214
38
200
228
224a
22
20
24
26
224
78
32
238
77
194
78
86
84
82
80
76
77
194
218
30
OXYGEN-CONTAINING GAS
FUEL GAS

FUEL CELL

RELATED APPLICATIONS

This application is a 35 U.S.C. 371 national stage filing of International Application No. PCT/JP2007/064038, filed 9 Jul. 2007, which claims priority to Japan Patent Application No. 2006-217015 filed on 9 Aug. 2006 in Japan. The contents of the aforementioned applications are hereby incorporated by reference.

TECHNICAL FIELD

The present invention relates to a fuel cell formed by stacking an electrolyte electrode assembly and separators. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as the air to the anode and the cathode of the electrolyte electrode assembly, a fuel gas channel and an oxygen-containing gas channel are formed along surfaces of the separator. The fuel cell stack may adopt internal manifold structure where a fuel gas supply unit and an oxygen-containing gas supply unit extend in the stacking direction for distributing the fuel gas and the oxygen-containing gas to each fuel gas channel and each oxygen-containing gas channel.

For example, in a flat plate type solid oxide fuel cell disclosed in Japanese Laid-Open Patent Publication No. 10-172594, unit cells (not shown) and separators 1 are provided alternately, and as shown in FIG. 22, at four corners of the separator 1 gas supply holes 2*a*, 3*a*, and gas discharge holes 2*b*, 3*b* extend through the separator 1 in the stacking direction, and a plurality of gas flow grooves 4*a* and ridges 4*b* in a plurality of rows are arranged alternately along the surface of the separator 1.

The gas flow grooves 4*a* are connected to the gas supply hole 2*a* and the gas discharge hole 2*b* through triangular recesses 5*a*, 5*b*. A throttle section 6 and blocks 7 are provided in a gas inlet section of the triangular recess 5*a*, near the gas supply hole 2*a*, as means for limiting the flow rate of the gas. The throttle section 6 and the blocks 7 function to increase the pressure loss of the gas flowing from the gas supply hole 2*a* to the gas inlet section.

Further, at opposite ends of the gas flow grooves 4*a*, a shallow gas flow inlet 8*a* and a shallow gas flow outlet 8*b* are provided, for functioning to increase the pressure loss of the gas flow.

However, in Japanese Laid-Open Patent Publication No. 10-172594, in the middle of producing or using the separator 1, when foreign materials such as dust are clogged in the throttle section 6, it is not possible to supply the reactant gas from the gas supply hole 2*a* to the gas flow grooves 4*a*. Therefore, the whole separator 1 needs to be replaced, and the cost required for production and maintenance of the separator 1 is high.

Further, at the time of stacking a plurality of the separators 1 and unit cells alternately into a stack, it is necessary to reliably seal the gas supply holes 2*a*, 3*a* and the gas discharge holes 2*b*, 3*b*, and it is necessary to apply a relatively large tightening load to the separators 1. When the relatively large tightening load for sealing is applied to each of the unit cells arranged corresponding to the gas flow grooves 4*a* and the ridges 4*b*, the unit cells are excessively pressed. Therefore, the unit cells may be damaged undesirably.

DISCLOSURE OF INVENTION

The present invention solves the above problems, and an object of the present invention is to provide a fuel cell having simple and economical structure in which it is possible to supply reactant gases along electrode surfaces of stacked electrolyte electrode assemblies, and problems of entry of dust or the like are eliminated simply.

The present invention relates to a fuel cell formed by stacking an electrolyte electrode assembly and separators. The electrolyte electrode assembly comprises an anode, a cathode, and an electrolyte interposed between the anode and the cathode, the electrolyte electrode assembly is sandwiched between the separators.

Each of the separators comprises a sandwiching section having a fuel gas channel for supplying a fuel gas along an electrode surface of the anode and an oxygen-containing gas channel for supplying an oxygen-containing gas along an electrode surface of the cathode, separately, a bridge connected to the sandwiching section, and having a reactant gas supply channel for supplying the fuel gas to the fuel gas channel or supplying the oxygen-containing gas to the oxygen-containing gas channel, and a reactant gas supply unit connected to the bridge, and having a reactant gas supply passage for supplying the fuel gas or the oxygen-containing gas to the reactant gas supply channel, the reactant gas supply passage extending through the reactant gas supply unit in a stacking direction.

A flow path member is detachably provided at the reactant gas supply unit. The flow path member includes an orifice section having orifice holes for reducing the flow rate of the fuel gas or the oxygen-containing gas supplied from the reactant gas supply passage to the reactant gas supply channel.

According to another embodiment of the present invention, a flow path member is detachably provided at the reactant gas supply unit, and the flow path member includes a filter section having filter holes for filtering the fuel gas or the oxygen-containing gas supplied from the reactant gas supply passage to the reactant gas supply channel.

According to the present invention, the flow path member includes the orifice section, and in the presence of the orifice section, the pressure loss of the reactant gas (fuel gas and/or oxygen-containing gas) from the reactant gas supply passage to the reactant gas supply channel becomes larger than the pressure loss of the reactant gas in the reactant gas supply passage. In the structure, it is possible to uniformly supply the reactant gas in the stacking direction of the separators and/or in the direction along the surfaces of the separators. Thus, improvement in the power generation performance is achieved, and power generation is carried out stably.

According to the present invention, the flow path member includes the filter section, and the fuel gas or the oxygen-containing gas supplied from the reactant gas supply passage to the reactant gas supply channel is filtered, and foreign materials such as dust are eliminated. In the structure, it is possible to prevent clogging in the channel grooves or holes connecting the reactant gas supply channel to the fuel gas channel or the oxygen-containing gas channel.

Further, the flow path member is detachably provided at the reactant gas supply unit. Therefore, when foreign materials such as dust are clogged in the orifice section or in the filter section, it is sufficient to simply replace the flow path member, instead of replacing the entire separator. Thus, the production cost and the maintenance expenditure of the separators are reduced economically.

BEST MODE FOR CARRYING OUT THE INVENTION

Figure 1:
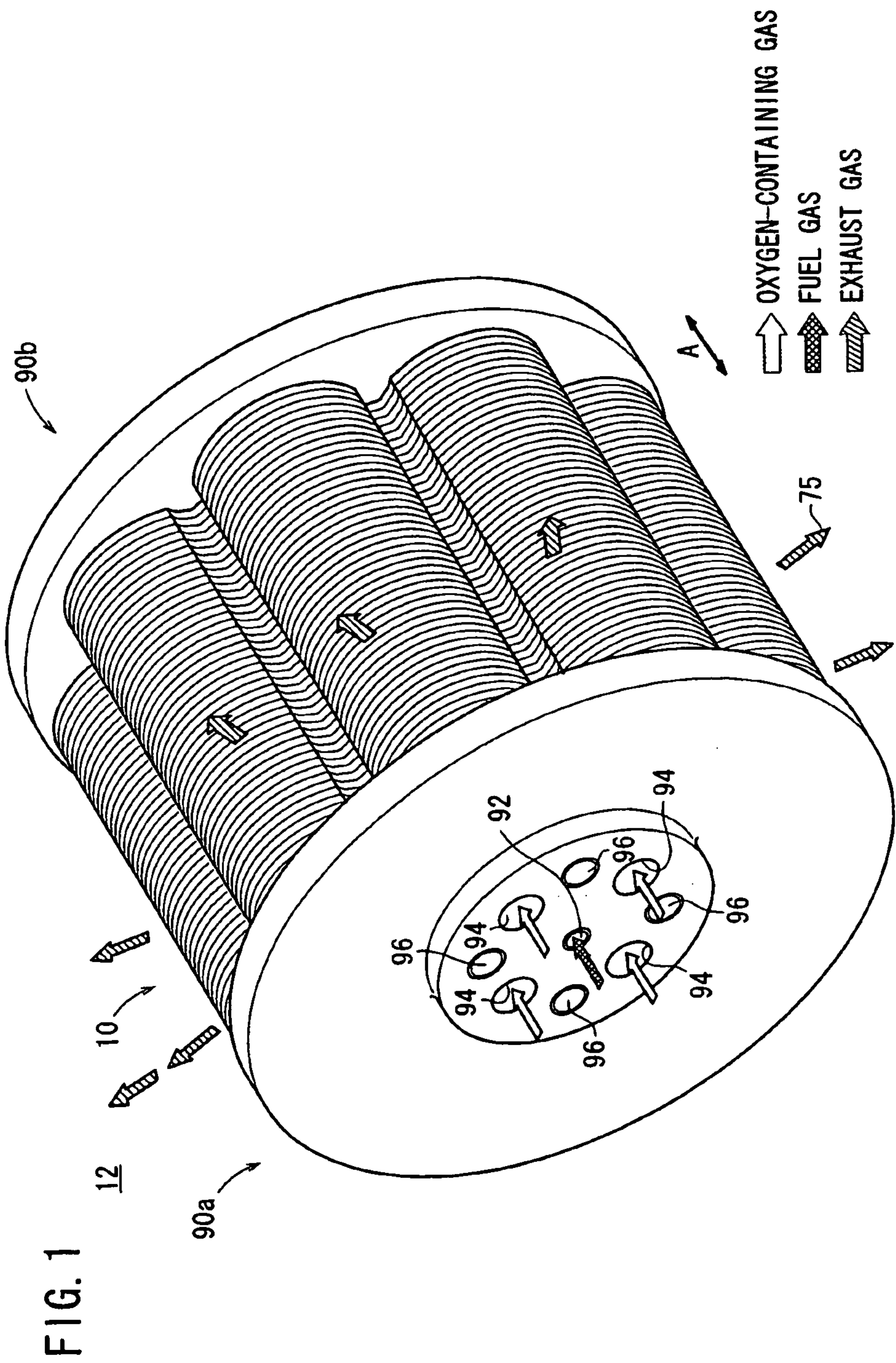
FIG. 1 is a perspective view schematically showing a fuel cell stack formed by stacking fuel cells according to a first embodiment of the present invention.

FIG. 1 is a perspective view schematically showing a fuel cell stack 12 formed by stacking fuel cells 10 according to a first embodiment of the present invention in a direction indicated by an arrow A.

The fuel cell stack 12 is used in various applications, including stationary and mobile applications. For example, the fuel cell stack 12 is mounted on a vehicle.

Figure 2:
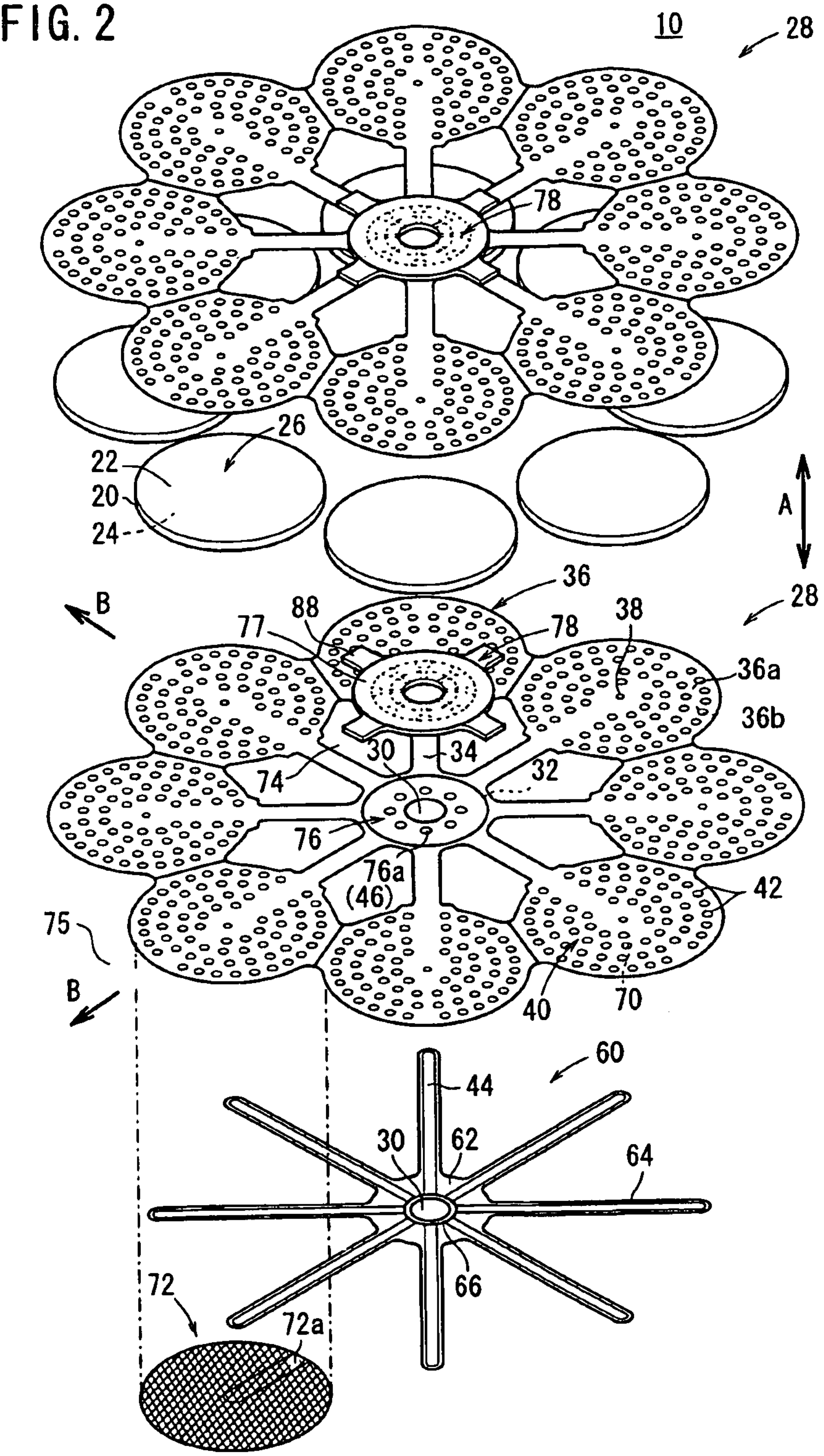
FIG. 2 is an exploded perspective view showing the fuel cell.
Figure 3:
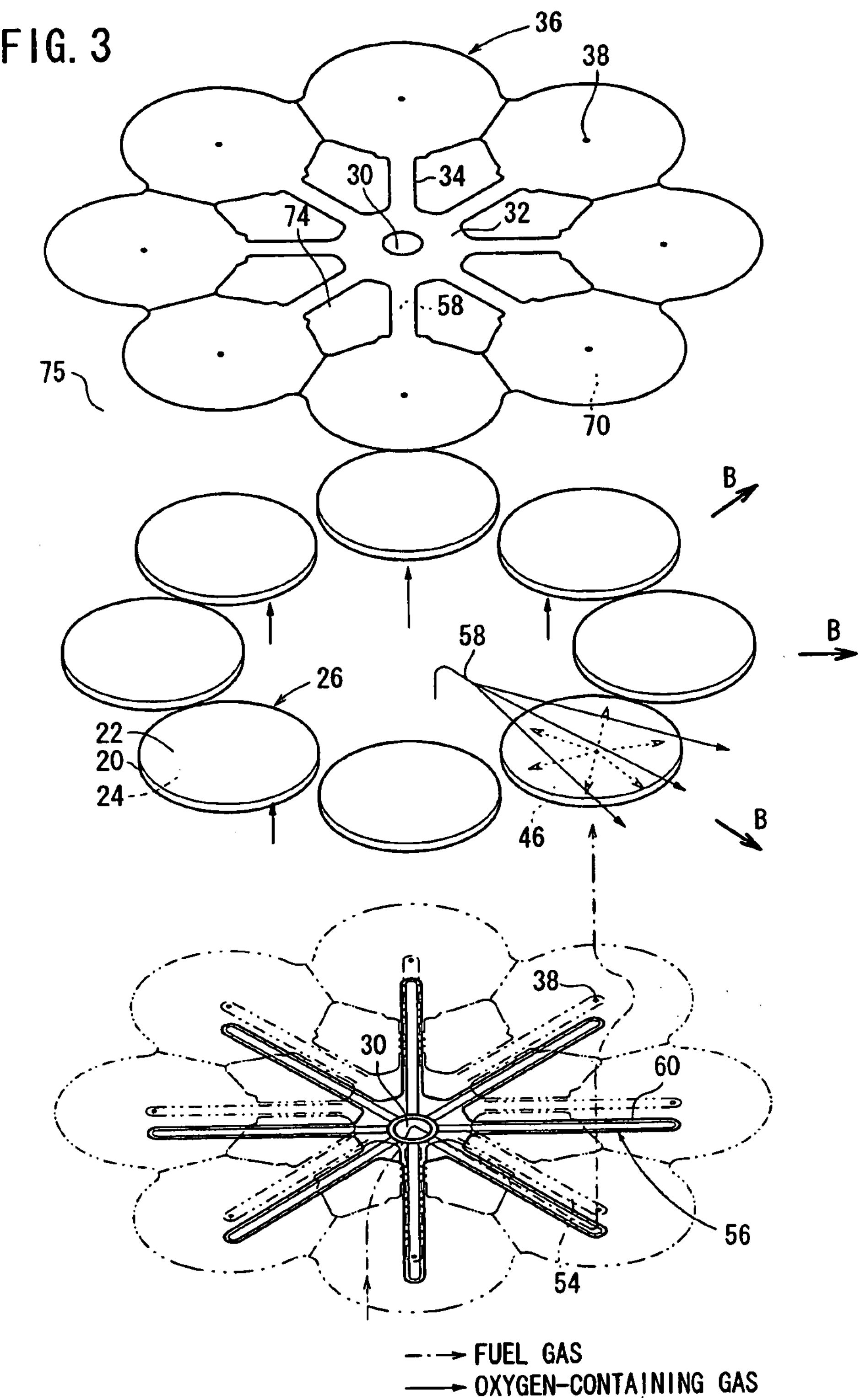
FIG. 3 is a partial exploded perspective view showing gas flows in the fuel cell.

The fuel cell 10 is a solid oxide fuel cell (SOFC). As shown in FIGS. 2 and 3, the fuel cell 10 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 is a thin plate having a circular disk shape. A barrier layer (not shown) is provided at least at the outer circumferential edge of the electrolyte electrode assembly 26 for preventing the entry or discharge of the oxygen-containing gas and the fuel gas.

A plurality of, e.g., eight electrolyte electrode assemblies 26 are sandwiched between a pair of separators 28 to form the fuel cell 10. The eight electrolyte electrode assemblies 26 are aligned along a virtual circle concentric with a fuel gas supply passage 30 extending through the center of the separators 28.

For example, each of the separators 28 comprises a single metal plate of, e.g., stainless alloy or a carbon plate. The separator 28 has a fuel gas supply unit (reactant gas supply unit) 32. The fuel gas supply passage 30 extends through the center of the fuel gas supply unit 32. The fuel gas supply unit 32 is integral with sandwiching sections 36 each having a circular shape with a relatively large diameter through a plurality of first bridges 34. The first bridges 34 extend radially outwardly from the fuel gas supply unit 32 at equal angles (intervals). The distances between the center of the fuel gas supply unit 32 and the centers of the sandwiching sections 36 are the same.

The sandwiching sections 36 and the electrolyte electrode assemblies 26 have substantially the same size. A fuel gas inlet 38 for supplying the fuel gas is provided, e.g., at the center of the sandwiching section 36, or at a position deviated toward the upstream side of the center of the sandwiching section 36 in the flow direction of the oxygen-containing gas. Each of the sandwiching sections 36 has a fuel gas channel 40 on a surface **36*a* which contacts the anode 24, for supplying a fuel gas along an electrode surface of the anode 24. The fuel gas channel 40 is formed by a plurality of protrusions 42 formed on the surface 36*a* of each of the sandwiching sections 36*a***.

The protrusions 42 are made of solid portions formed by, e.g., etching, or hollow portions formed by pressure forming. The cross sectional shape of the protrusion 42 may take various shapes such as a rectangular shape, a circular shape, an oval shape, an ellipse shape, a triangular shape or a square shape. The position and density of the protrusion 42 can be changed arbitrarily depending on the flow state of the fuel gas or the like. The other protrusions described below have the same structure as the protrusion 42.

Figure 4:
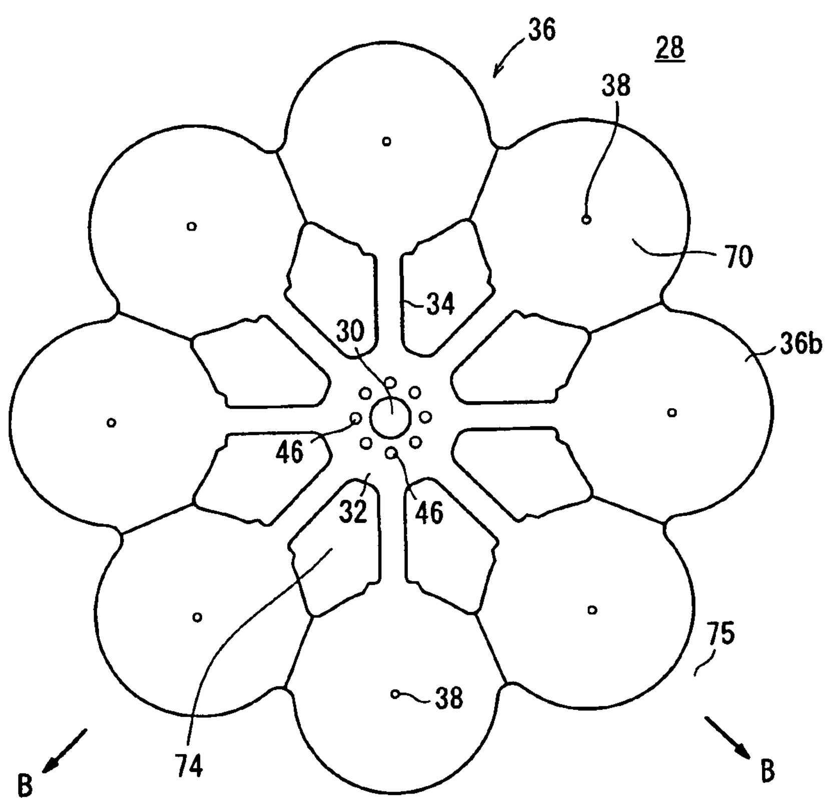
FIG. 4 is a view showing the separator.

In FIG. 4, each of the sandwiching sections 36 has a substantially planar surface **36*b* which contacts the cathode 22. As shown in FIGS. 2 and 4, a plurality of holes 46 are formed in the fuel gas supply unit 32 around the fuel gas supply passage 30**.

As shown in FIG. 2, a channel member 60 is fixed to a surface of the separator 28 facing the cathode 22, e.g., by brazing, laser welding, or the like. The channel member 60 has a planar plate shape. The channel member 60 has a fuel gas supply unit 62, and the fuel gas supply passage 30 extends through the center of the fuel gas supply unit 62. Eight second bridges 64 extend radially from the fuel gas supply unit 62. Each of the second bridges 64 is fixed to the separator 28 from the first bridge 34 to the surface **36*b* of the sandwiching section 36 to cover the fuel gas inlet 38 (see FIG. 5). From the fuel gas supply unit 62 to the second bridge 64, a fuel gas supply channel 44 connecting the fuel gas supply passage 30 to the fuel gas inlet 38 is formed. For example, the fuel gas supply channel 44 is formed by etching or pressure forming. In the fuel gas supply unit 62, a ring shaped protrusion 66 is formed around the fuel gas supply passage 30. The protrusion 66 seals the fuel gas supply passage 30 from the fuel gas supply channel 44**.

A deformable elastic channel unit such as an electrically conductive mesh member 72 is provided on a surface 36*b* of the sandwiching section 36. The electrically conductive mesh member 72 forms an oxygen-containing gas channel 70 for supplying an oxygen-containing gas along an electrode surface of the cathode 22, and tightly contacts the cathode 22.

For example, the mesh member 72 is made of a wire rod material such as stainless steel (SUS material), and has a circular disk shape. The thickness of the mesh member 72 is dimensioned such that, when a load in a stacking direction indicated by an arrow A is applied to the mesh member 72, the mesh member 72 is deformed elastically desirably to directly contact the surface 36*b* of the sandwiching section 36. The mesh member 72 has a cutout 72*a* for providing a space for the channel member 60 (see FIGS. 2 and 5).

Figure 5:
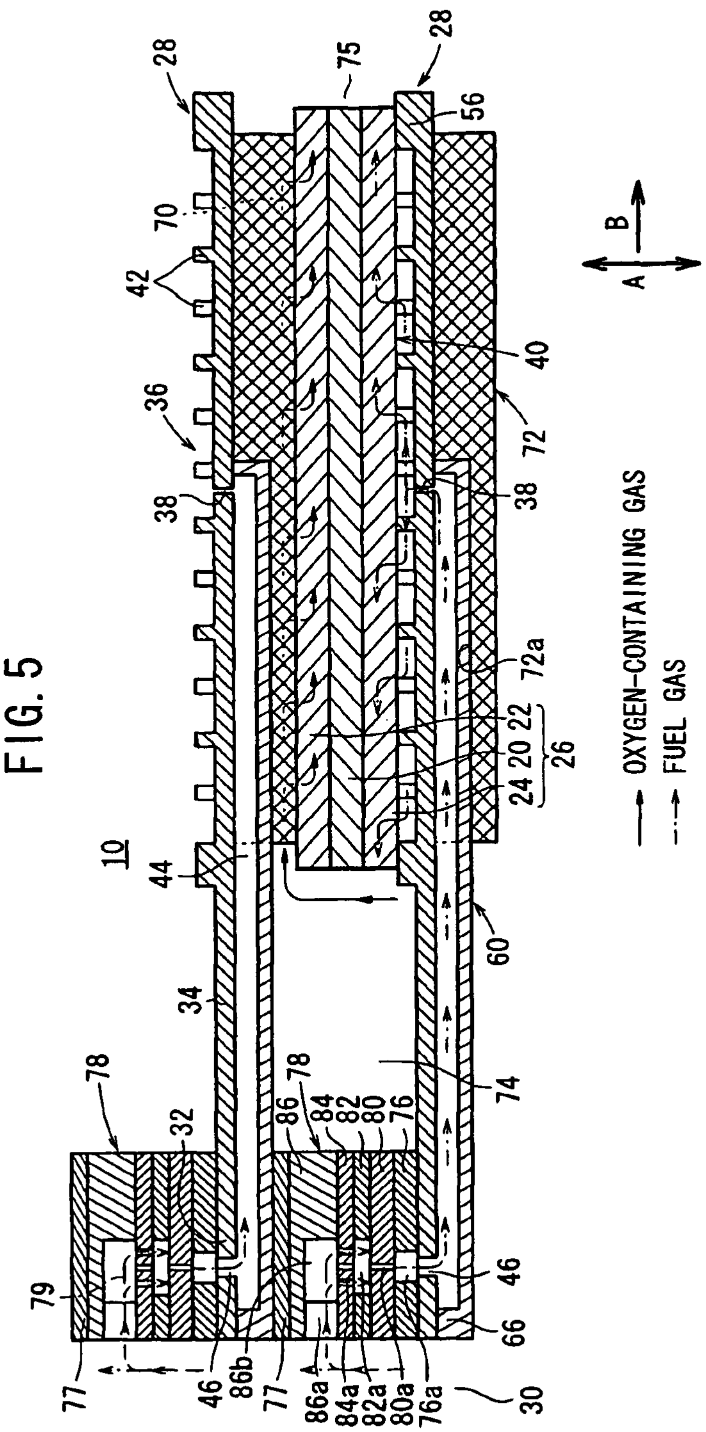
FIG. 5 is a cross sectional view schematically showing operation of the fuel cell.

As shown in FIG. 5, the area where the mesh member 72 is provided is smaller than the area of the cathode 22 of the electrolyte electrode assembly 26. The oxygen-containing gas channel 70 provided in the mesh member 72 is connected to the oxygen-containing gas supply passage 74 for supplying the oxygen-containing gas from a space between an inner circumferential edge of the electrolyte electrode assembly 26 and an inner circumferential edge of the sandwiching section 36 in a direction indicated by an arrow B. The oxygen-containing gas supply passage 74 extends among the sandwiching sections 36 and the respective first bridges 34 in the stacking direction indicated by the arrow A.

Insulating seals 76, 77 for sealing the fuel gas supply passage 30 are provided between the separators 28, around the holes 46, and a flow path member 78 is detachably provided between the insulating seals 76, 77. For example, the insulating seals 76, 77 are made of mica material, glass material, or ceramic material. The insulating seal 76 has a plurality of, e.g., eight holes 76*a* around the fuel gas supply passage 30.

Figure 6:
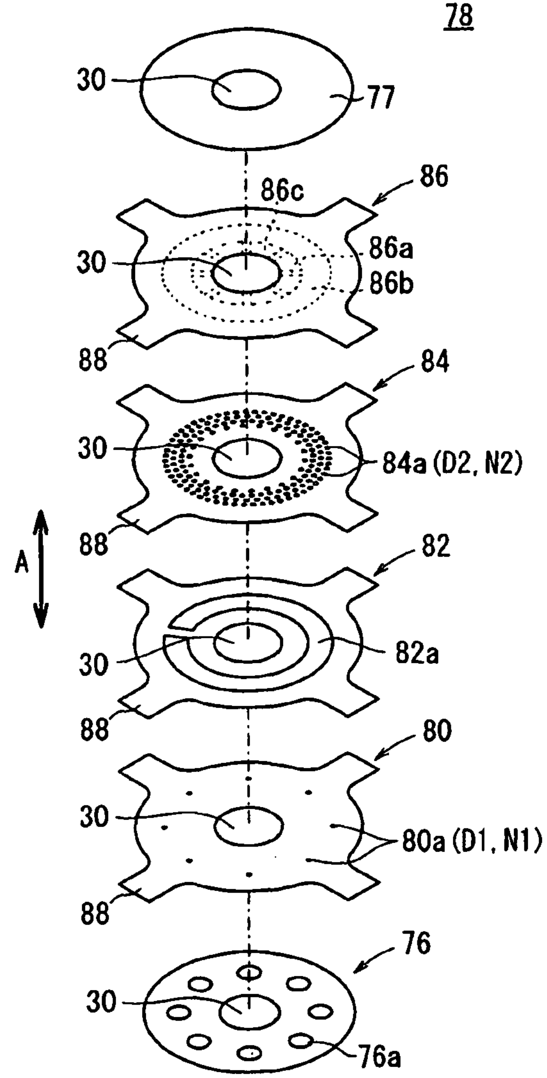
FIG. 6 is an exploded perspective view showing a flow path member of the fuel cell.
Figure 7:
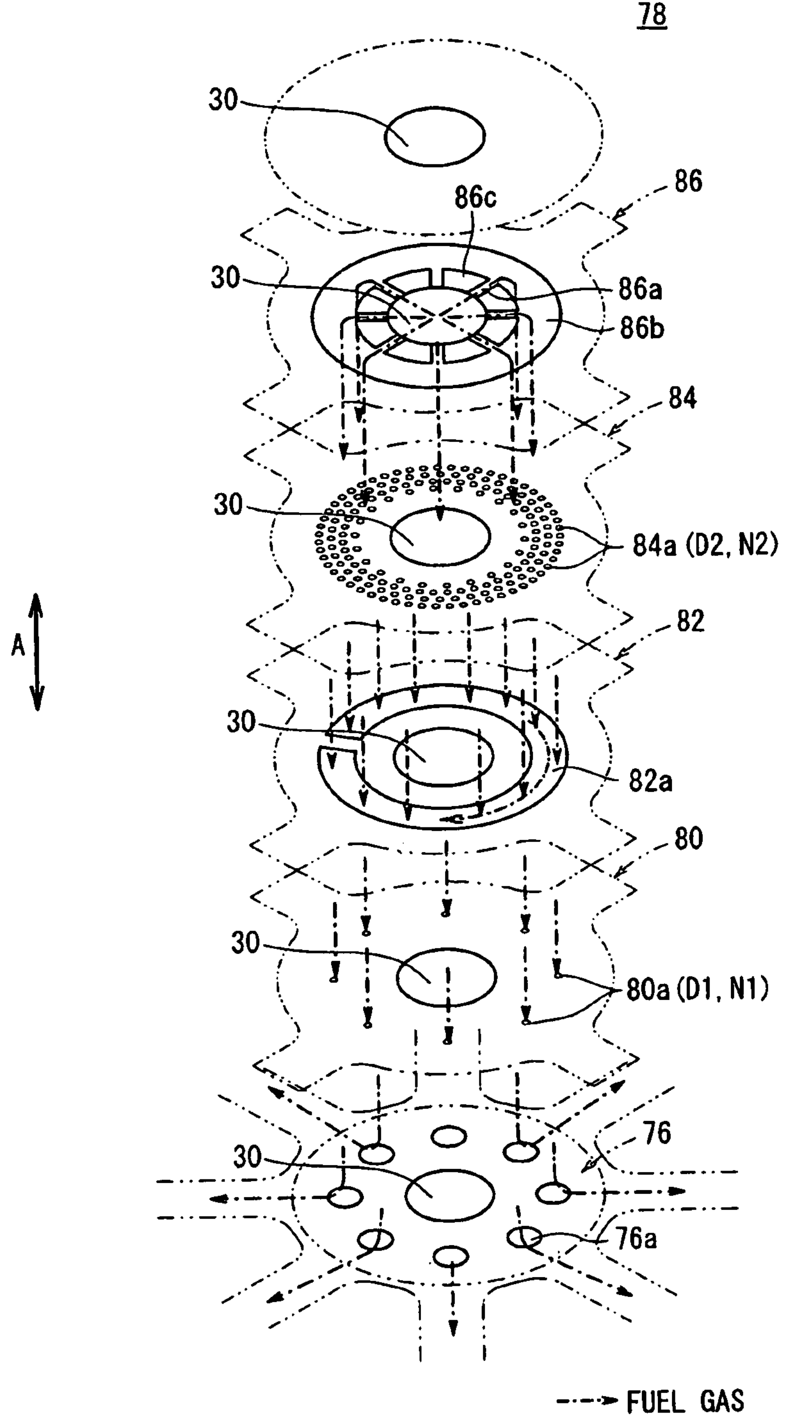
FIG. 7 is a view showing gas flows along the flow path member.

As shown in FIGS. 6 and 7, the flow path member 78 includes an orifice section 80 on the insulating seal 76. A pressure regulating section 82, a filter section 84, and a distribution section 86 are stacked on the orifice section 80. The pressure regulating section 82, the filter section 84, and the distribution section 86 are formed integrally with the orifice section 80 by diffusion bonding, laser welding, or the like. Each of the orifice section 80, the pressure regulating section 82, the filter section 84, and the distribution section 86 is a metal thin plate having a circular disk shape, and has at least one, e.g., four extensions 88 expanding outwardly.

Each of the extensions 88 corresponds to the first bridge 34. In effect, the four extensions 88 are stacked on the every other eight first bridges 34. Alternatively, eight extensions 88 are stacked on all of the eight first bridges 34, respectively.

In the orifice section 80, eight orifice holes 80*a* corresponding to the respective fuel gas supply channels 44 are formed, for reducing the flow rate of the fuel gas supplied from the fuel gas supply passage 30 to the fuel gas supply channels 44.

In the pressure regulating section 82, a pressure regulating chamber 82*a* comprising a partially closed substantially ring shaped opening is provided around the fuel gas supply passage 30.

In the filter section 84, a plurality of filter holes 84*a* are provided around the fuel gas supply passage 30, for filtering the fuel gas supplied from the fuel gas supply passage 30 to the fuel gas supply channel 44.

In the distribution section 86, on the surface facing the filter section 84, a plurality of distribution grooves 86*a* for distributing the fuel gas supplied from the fuel gas supply passage 30 to the filter section 84 are formed. The distribution grooves 86*a* are connected to a circular groove 86*b*, and the circular groove 86*b* is connected to the plurality of filter holes 84*a*. Protrusions 86*c* are provided between the distribution grooves 86*a* for preventing closure of the distribution grooves 86*a* by the tightening load.

In the flow path member 78, as shown in FIGS. 5 to 7, the pressure regulating chamber 82*a* is provided at a position connecting the orifice holes 80*a* and the filter holes 84*a*. The inner diameter D1 of the orifice hole 80*a* is larger than the inner diameter D2 of the filter hole 84*a* (D1>D2), and the number N1 of the orifice holes 80*a* is smaller than the number N2 of the filter holes 84*a* (N1<N2). In practice, the number N1 of the orifice holes 80*a* is eight.

As shown in FIG. 1, the fuel cell stack 12 includes substantially circular end plates 90*a*, 90*b* each having a circular disk shape at opposite ends of the fuel cells 10 in the stacking direction. At the center of the end plate 90*a*, a hole 92 corresponding to the fuel gas supply passage 30 is formed, and a plurality of holes 94 are formed around the hole 92, corresponding to the spaces of the oxygen-containing gas supply passage 74. The components between the end plates 90*a*, 90*b* are tightened together by bolts (not shown) screwed into the screw holes 96.

Next, operation of the fuel cell stack 12 will be described. In assembling the fuel cell stack 12, firstly, as shown in FIG. 2, the channel member 60 is joined to a surface of the separator 28 facing the cathode 22. Thus, a fuel gas supply channel 44 connected to the fuel gas supply passage 30 is formed between the separator 28 and the channel member 60. The fuel gas supply channel 44 is connected to the fuel gas channel 40 through the fuel gas inlet 38 and (see FIG. 5).

The protrusion 66 of the channel member 60 is fixed to the fuel gas supply unit 32 of the separator 28 to prevent the fuel gas supply passage 30 from being directly connected to the fuel gas supply channel 44. That is, the fuel gas supply passage 30 is only connected to the fuel gas supply channel 44 through the holes 46.

Further, ring shaped insulating seals 76, 77 are provided between the separators 28 around the fuel gas supply passage 30. In the structure, the fuel gas supply passage 30 is sealed from the oxygen-containing gas supply passage 74 and the exhaust gas channel 75, and the fuel gas supply passage 30 is connected to the fuel gas supply channel 44 through the flow path member 78. The eight electrolyte electrode assemblies 26 are sandwiched between the separators 28 to form the fuel cell 10.

As shown in FIGS. 3 and 4, the electrolyte electrode assemblies 26 are provided between the surfaces 36*a*, 36*b* of the separators 28 facing each other. The fuel gas inlet 38 is provided at substantially the center of each of the anodes 24. The mesh member 72 is interposed between the surface 36*b* of the separator 28 and the electrolyte electrode assembly 26. The channel member 60 is provided in the cutout 72*a* of the mesh member 72. A plurality of the fuel cells 10 are stacked in the direction indicated by the arrow A, and end plates 90*a*, 90*b* are provided at opposite ends in the stacking direction to form the fuel cell stack 12.

Then, in the fuel cell stack 12, as shown in FIG. 1, the fuel gas (hydrogen-containing gas) is supplied from the hole 92 of the end plate 90a to the fuel gas supply passage 30, and the oxygen-containing gas (hereinafter also referred to as the air) is supplied from the holes 94 of the end plate 90a to the oxygen-containing gas supply passage 74.

The fuel gas flows along the fuel gas supply passage 30 in the stacking direction indicated by the arrow A, and is supplied to the flow path member 78 in each of the fuel cells 10. As shown in FIGS. 5 and 7, the fuel gas moving through the fuel gas supply passage 30 in the flow path member 78 partially flows into the distribution grooves 86a of the distribution section 86, toward the circular groove 86b. The circular groove 86b is connected to the filter holes 84a provided in the filter section 84. Thus, the fuel gas flows from the circular groove 86b to the pressure regulating chamber 82a of the pressure regulating section 82 through the filter hole 84a.

After the pressure of the fuel gas is regulated in the pressure regulating chamber 82a, the fuel gas flows through the orifice holes 80a provided in the orifice section 80. Then, the fuel gas flows through the holes 76a of the insulating seal 76 and the holes 46 to the fuel gas supply channel 44. Thus, the fuel gas flows along the fuel gas supply channel 44 along the surface of the separator 28 in the direction indicated by the arrow B.

As shown in FIG. 5, the fuel gas flows from the fuel gas supply channel 44 to the fuel gas channel 40 through the fuel gas inlet 38 formed in the sandwiching section 36. The fuel gas inlet 38 is provided at substantially the central position of the anode 24 of each of the electrolyte electrode assemblies 26. Thus, the fuel gas is supplied from the fuel gas inlet 38 to the substantially center of the anode 24. The fuel gas flows along the fuel gas channel 40 toward the outer circumferential region of the anode 24.

The air supplied to the oxygen-containing gas supply passage 74 flows into the space between the inner circumferential edge of the electrolyte electrode assembly 26 and the inner circumferential edge of the sandwiching section 36 in the direction indicated by the arrow B. The oxygen-containing gas is supplied to the oxygen-containing gas channel 70 formed in the mesh member 72. In the oxygen-containing gas channel 70, the oxygen-containing gas flows from the inner circumferential edge of the cathode 22 (center of the separator 28) to the outer circumferential edge of the cathode 22 (outer circumferential edge of the separator 28).

Thus, in the electrolyte electrode assembly 26, the fuel gas flows from the center to the outer circumferential side on the electrode surface of the anode 24, and the oxygen-containing gas flows in one direction indicated by the arrow B on the electrode surface of the cathode 22. At this time, oxygen ions flow through the electrolyte 20 toward the anode 24 for generating electricity by electrochemical reactions.

The air after power generation reaction and the fuel gas after power generation reaction discharged from the outer circumferential region of each of the electrolyte electrode assemblies 26 flows into the exhaust gas channel 75 as the off gas, and is discharged from the fuel cell stack 12 (see FIG. 1).

In the first embodiment, the flow path member 78 has the orifice section 80, and the orifice holes 80a are formed in the orifice section 80. In the structure, in the orifice section 80, the pressure loss of the fuel gas from the fuel gas supply passage 30 to the fuel gas supply channel 44 is larger than the pressure loss of the fuel gas in the fuel gas supply passage 30.

Therefore, it is possible to distribute the fuel gas uniformly in the stacking direction of the separators 28, and along the surfaces of the separators 28 (between the bridges 34, 64 and along the sandwiching sections 36. It is possible to achieve uniform and stable power generation performance in each of the electrolyte electrode assemblies 26, and stable power generation in the fuel cell stack 12. Further, since the orifice holes 80a are provided, the fuel gas inlet 38 can have a relatively large diameter. Thus, clogging of the fuel gas inlet 38 is prevented suitably.

Further, in the first embodiment, the filter section 84 of the flow path member 78 has a large number of filter holes 84a. Thus, the fuel gas supplied from the fuel gas supply passage 30 to the fuel gas supply channel 44 can be filtered, and it is possible to reliably prevent the entry of foreign materials such as dust into the fuel gas supply channel 44.

In the structure, it is possible to prevent clogging in the channel grooves or holes (e.g., the fuel gas inlet 38) connected from the fuel gas supply channel 44 to the fuel gas channel 40, and fuel gas is suitably and smoothly supplied to the anode 24.

Further, in the first embodiment, the flow path member 78 is detachably provided at the fuel gas supply unit 32, via the insulating seals 76, 77. Therefore, when foreign materials such as dust are clogged in the orifice section 80, or when the foreign materials are clogged in the filter section 84, it is sufficient to simply replace the flow path member 78, and it is not necessary to replace the entire separator 28. Thus, the production cost and the maintenance expenditure of the separators 28 are reduced economically.

Further, in the flow path member 78, the filter section 84 is provided on the upstream side of the orifice section 80 in the flow direction of the fuel gas. Therefore, the fuel gas is firstly filtered by the filter section 84 in the middle of flowing from the fuel gas supply passage 30 to the fuel gas supply channel 44. After the foreign materials such as dust are removed, the fuel gas flows into the orifice section 80. Thus, in the orifice section 80, it is possible to suitably prevent clogging in the orifice holes 80a.

The inner diameter D2 of the filter holes 84a of the filter section 84 is smaller than the inner diameter D1 of the orifice holes 80a of the orifice section 80. Therefore, further improvement in the function of removing foreign materials in the filter section 84 is achieved, and clogging in the orifice holes 80a of the orifice section 80 is prevented as much as possible.

The number N2 of the filter holes 84a is larger than the number N1 of the orifice holes 80a. Even if some of the filter holes 84a are clogged with foreign materials such as dusts, it is possible to suitably supply the fuel gas to the orifice section 80.

Further, the pressure regulating section 82 for regulating the pressure of the fuel gas is provided between the filter section 84 and the orifice section 80. The pressure regulating section 82 functions to rectify pressure fluctuation of the fuel gas supplied from the fuel gas supply passage 30 to the fuel gas supply channel 44, and uneven pressure of the fuel gas flowing along the separators 28. Thus, it becomes possible to uniformly supply the fuel gas through the respective orifice holes 80a to the fuel gas supply channel 44, and achieve improvement and stability of the power generation performance by the electrolyte electrode assemblies 26.

Further, the distribution section 86 of the flow path member 78 has the distribution grooves 86a for distributing the fuel gas flowing through the fuel gas supply passage 30 in the stacking direction to the fuel gas supply channel 44 where the fuel gas flows along the separator surface. Thus, it is possible to smoothly change the flow direction of the supplied fuel gas from the stacking direction to the direction along the separator surface. Further, the protrusions 86c provided between the distribution grooves 86a receive the tightening load applied to the region near the fuel gas supply passage 30, making it possible to prevent clogging of the distribution grooves 86a. Since the tightening load is interrupted through the bridges

34, 64, no excessive tightening load is applied to each of the electrolyte electrode assemblies 26.

Further, in the flow path member 78, one to eight, specifically, four extensions 88 are provided, corresponding to the number of the first bridges 34. Therefore, simply by arranging the extensions 88 on the first bridge 34 in an overlapping manner, it is possible to reliably provide the flow path without clogging of the holes 46, and operation of attaching the flow path member 78 is achieved easily and reliably.

Figure 8:
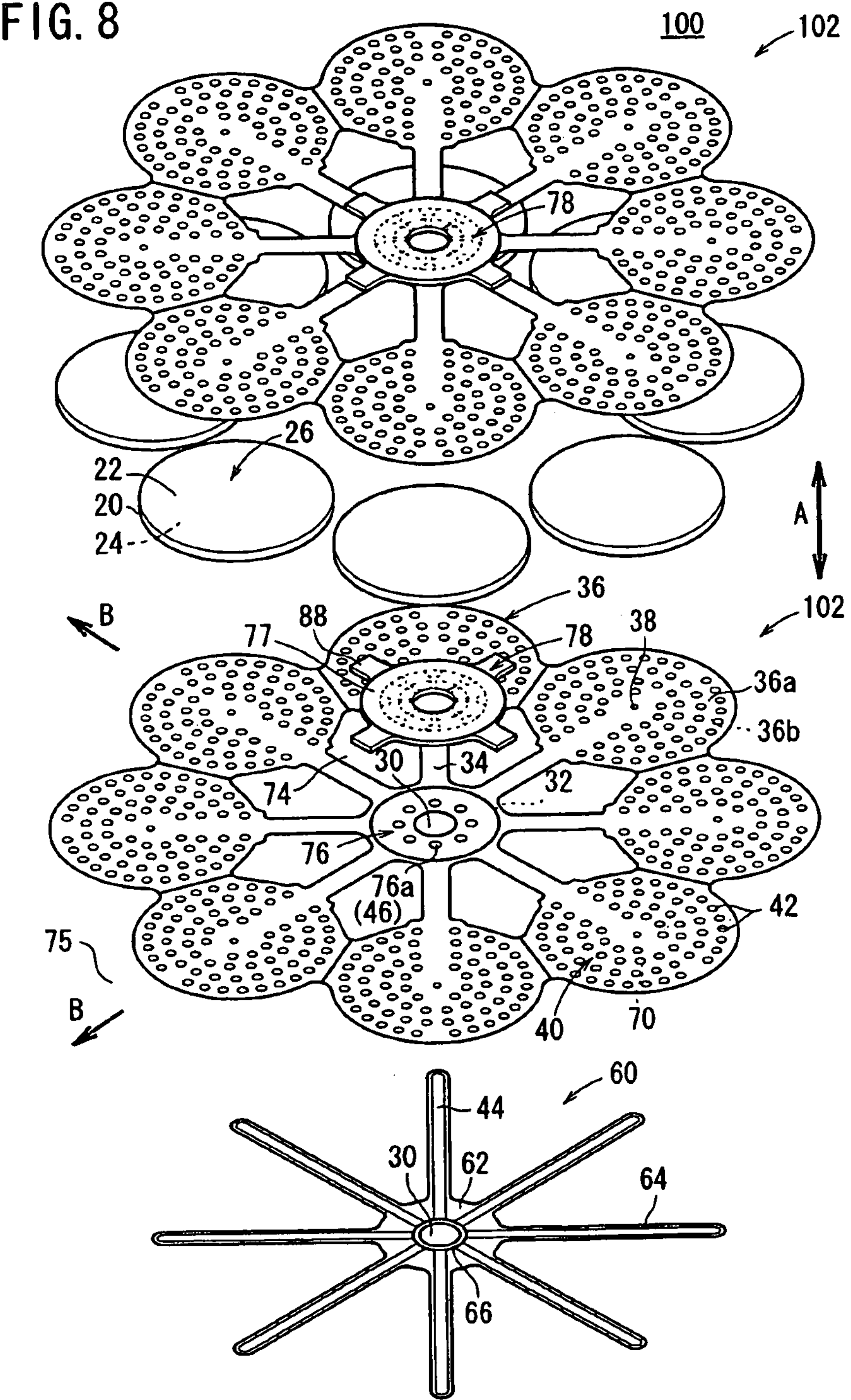
FIG. 8 is an exploded perspective view showing a fuel cell according to a second embodiment.

FIG. 8 is an exploded perspective view showing a fuel cell 100 according to a second embodiment of the present invention. The constituent elements that are identical to those of the fuel cell system 10 according to the first embodiment are labeled with the same reference numeral, and description thereof will be omitted. Also in third to sixth embodiments as described later, the constituent elements that are identical to those of the fuel cell system 10 according to the first embodiment are labeled with the same reference numeral, and description thereof will be omitted.

Figure 9:
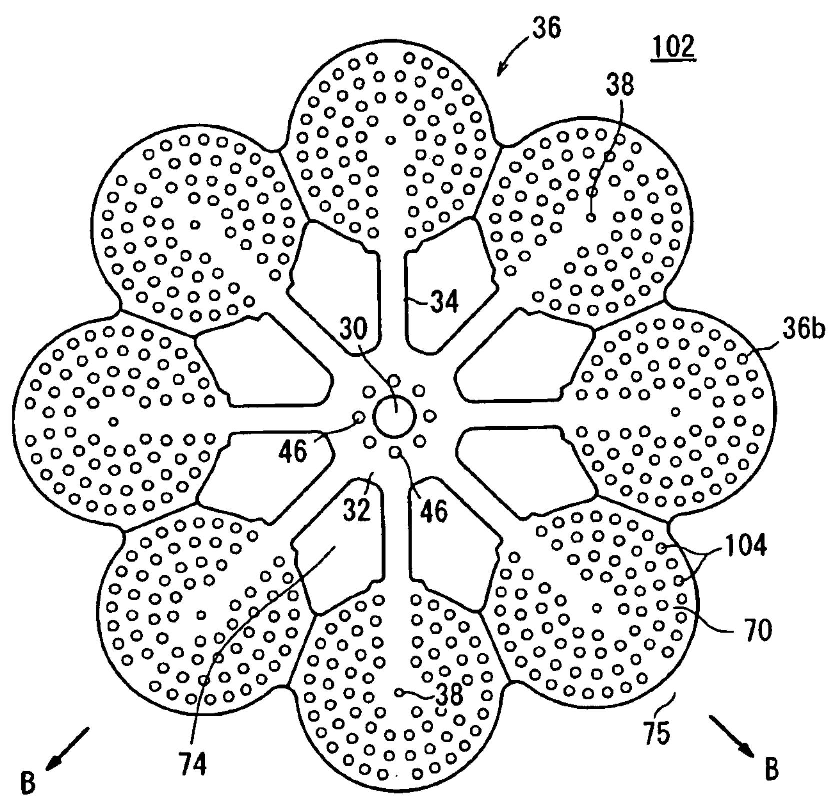
FIG. 9 is a front view showing a separator of the fuel cell.
Figure 10:
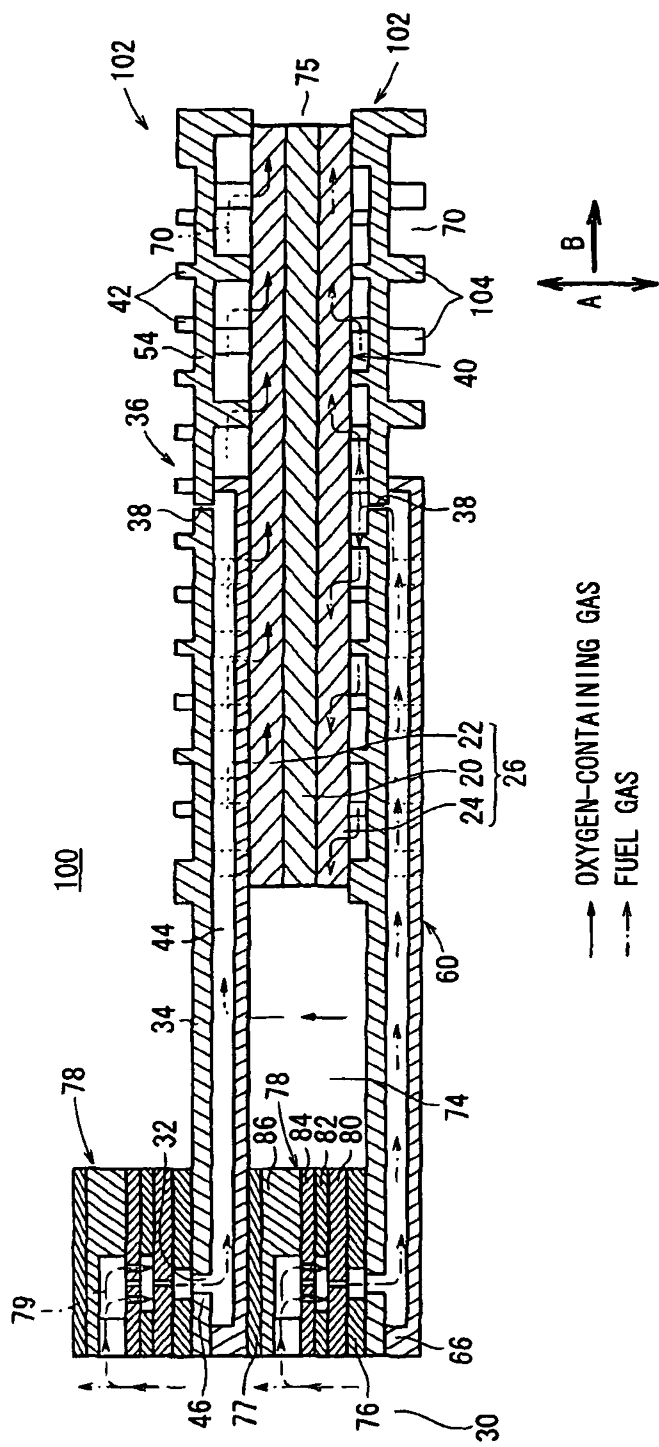
FIG. 10 is a cross sectional view schematically showing operation of the fuel cell.

The fuel cell 100 includes a separator 102 having an oxygen-containing gas channel 70 on a surface facing the cathode 22. The oxygen-containing gas channel 70 is formed by a plurality of protrusions 104 formed on a surface 36*b* of each sandwiching section 36 (see FIGS. 9 and 10). The structure of the protrusion 104 is the same as the structure of the protrusion 42.

In the second embodiment, distortions of the electrolyte electrode assembly 26 and the separator 102 are reduced by the protrusions 42, 104. Therefore, the same advantages as in the case of the first embodiment including uniform flow of the oxygen-containing gas can be obtained.

Figure 11:
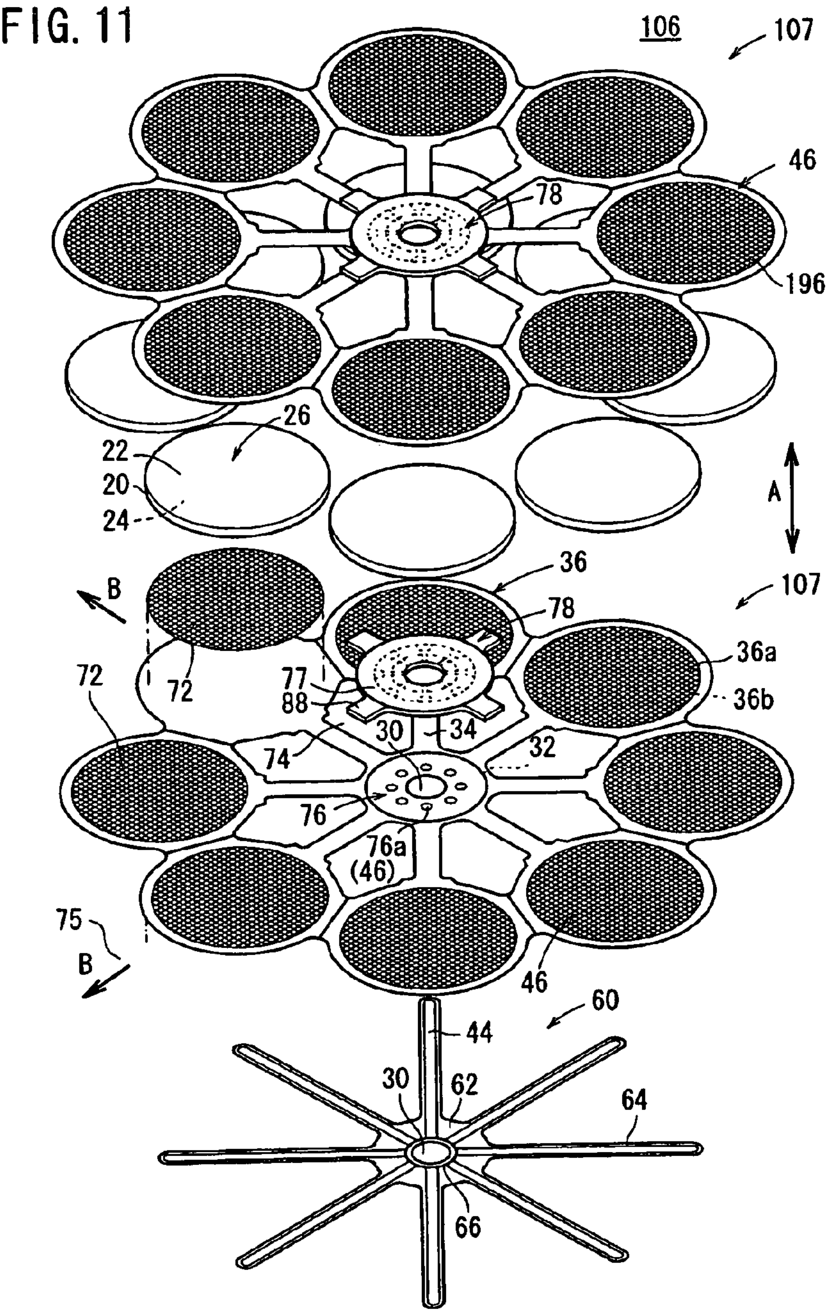
FIG. 11 is an exploded perspective view showing a fuel cell according to a third embodiment of the present invention.
Figure 12:
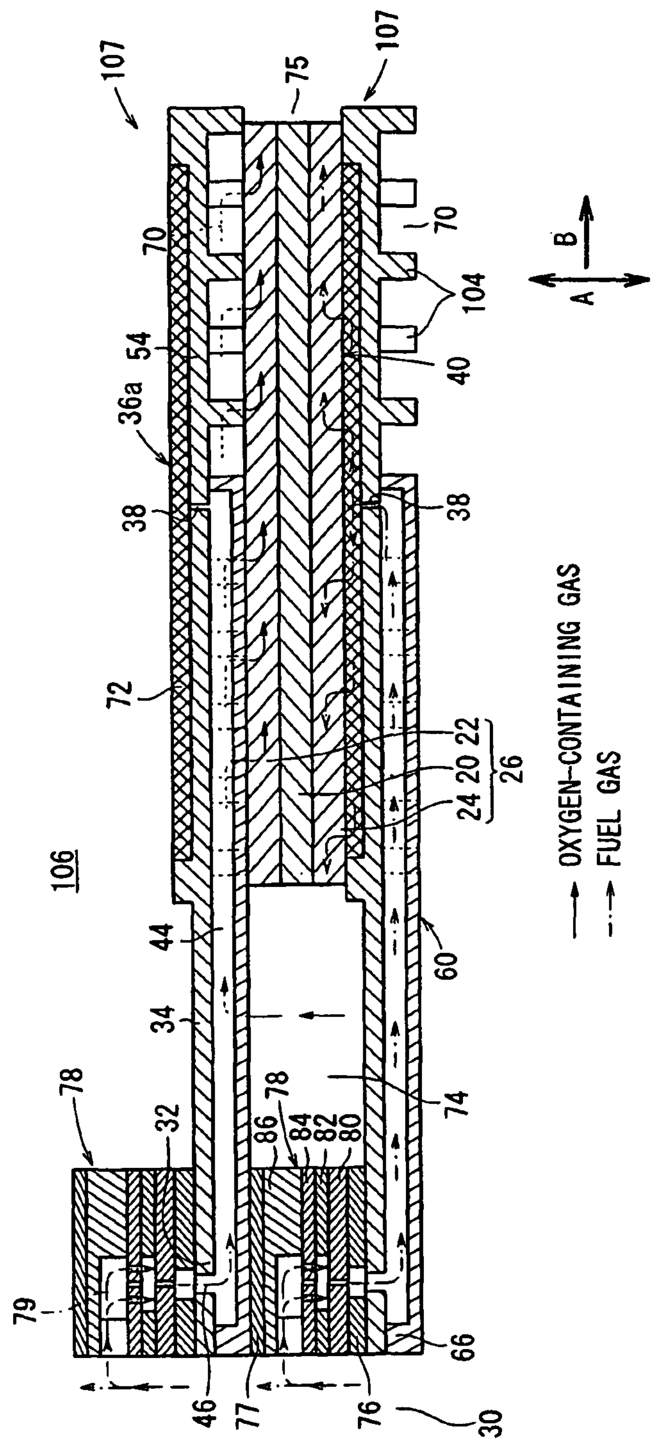
FIG. 12 is a cross sectional view schematically showing operation of the fuel cell.

FIG. 11 is an exploded perspective view showing a fuel cell 106 according to a third embodiment of the present invention. FIG. 12 is a cross sectional view schematically showing operation of the fuel cell 106.

The fuel cell 106 includes a separator 107 having a fuel gas channel 40 for supplying a fuel gas along an electrode surface of the anode 24, on a surface 36*a* of the sandwiching section 36. Further, the separator 107 has a deformable elastic channel member such as a mesh member 72. The elastic channel member tightly contacts the anode 24.

In the third embodiment, by deformation of the mesh member 72, for example, the mesh member 72 tightly contacts the anode 24 advantageously.

Figure 13:
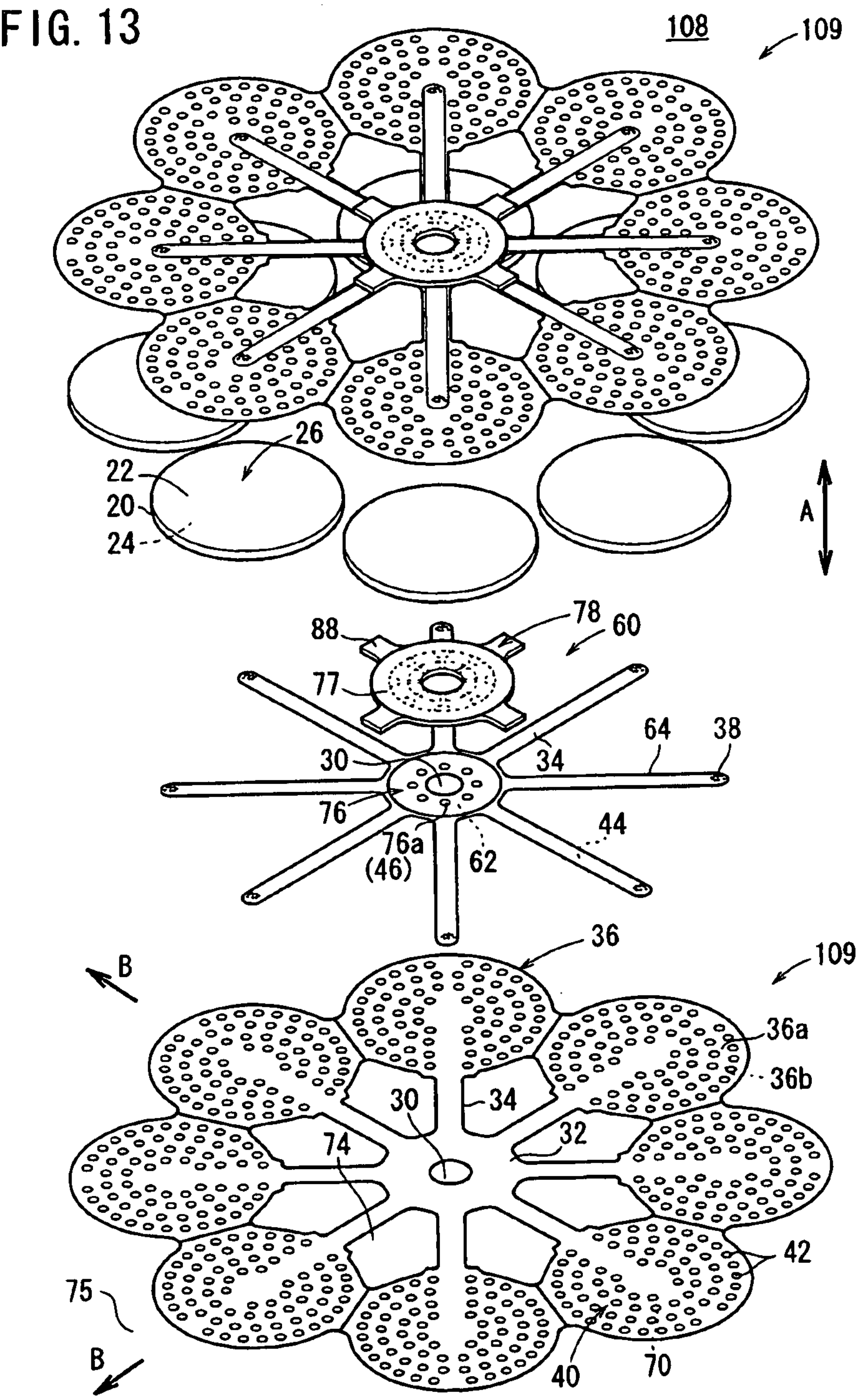
FIG. 13 is an exploded perspective view showing a fuel cell according to a fourth embodiment of the present invention.
Figure 14:
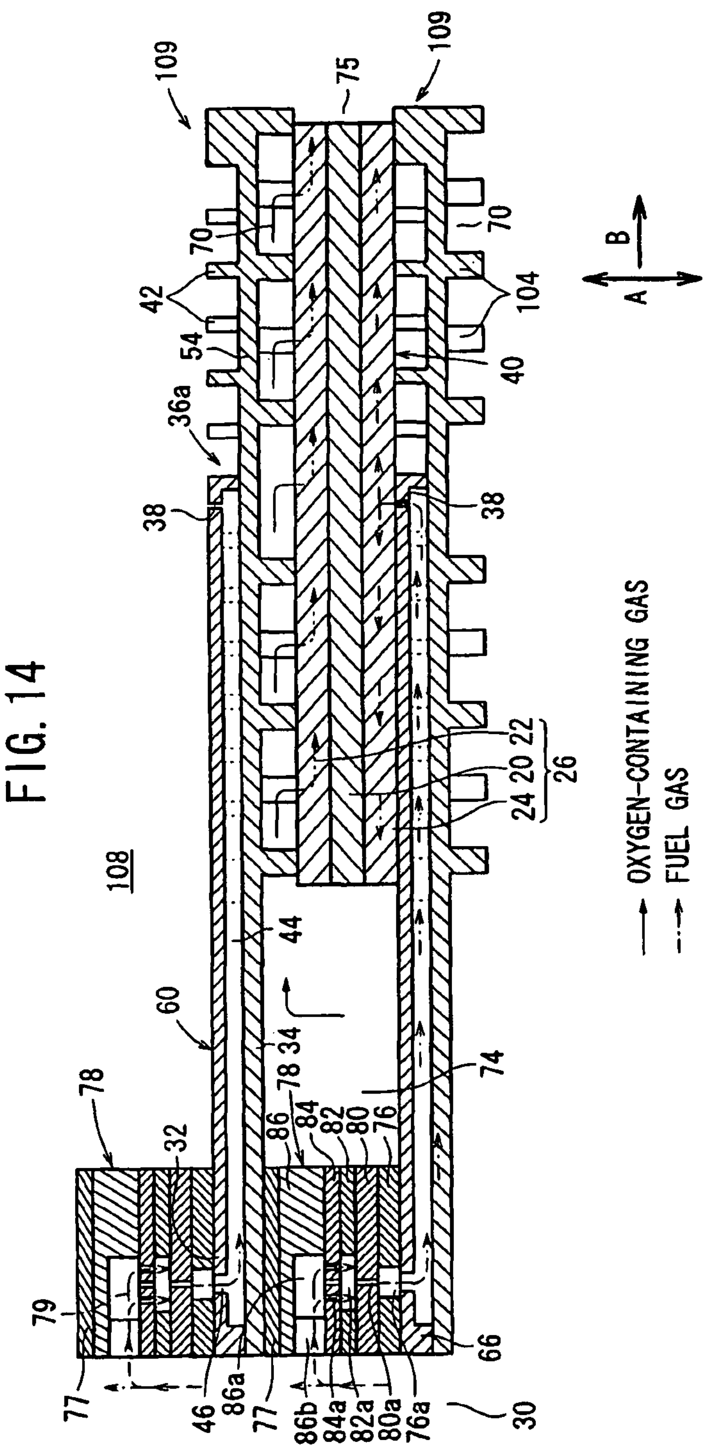
FIG. 14 is a cross sectional view schematically showing operation of the fuel cell.

FIG. 13 is an exploded perspective view showing a fuel cell 108 according to a fourth embodiment of the present invention. FIG. 14 is a cross sectional view schematically showing operation of the fuel cell 108.

The fuel cell 108 has a separator 109, and a channel member 60 is fixed to a surface of the separator 109 facing the anode 24. A plurality of fuel gas inlets 38 are formed at the tip end of each second bridge 64, and holes 46 are formed in the fuel gas supply unit 62 around the fuel gas supply passage 30. The sandwiching section 36 does not have the fuel gas inlet 38. A flow path member 78 is detachably provided on the fuel gas supply unit 62 of the channel member 60.

Figure 15:
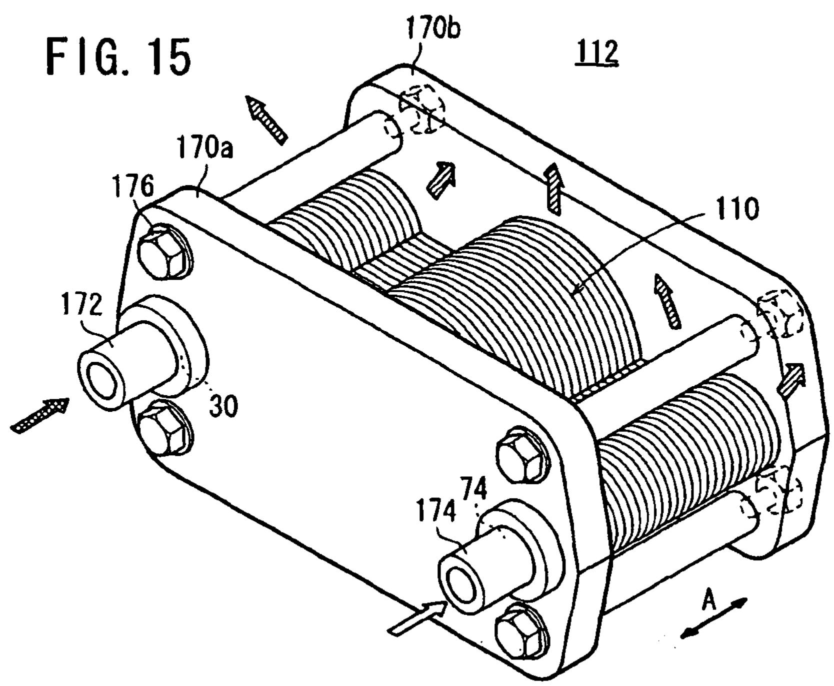
FIG. 15 is a perspective view schematically showing a fuel cell stack formed by stacking fuel cells according to a fifth embodiment of the present invention.
Figure 16:
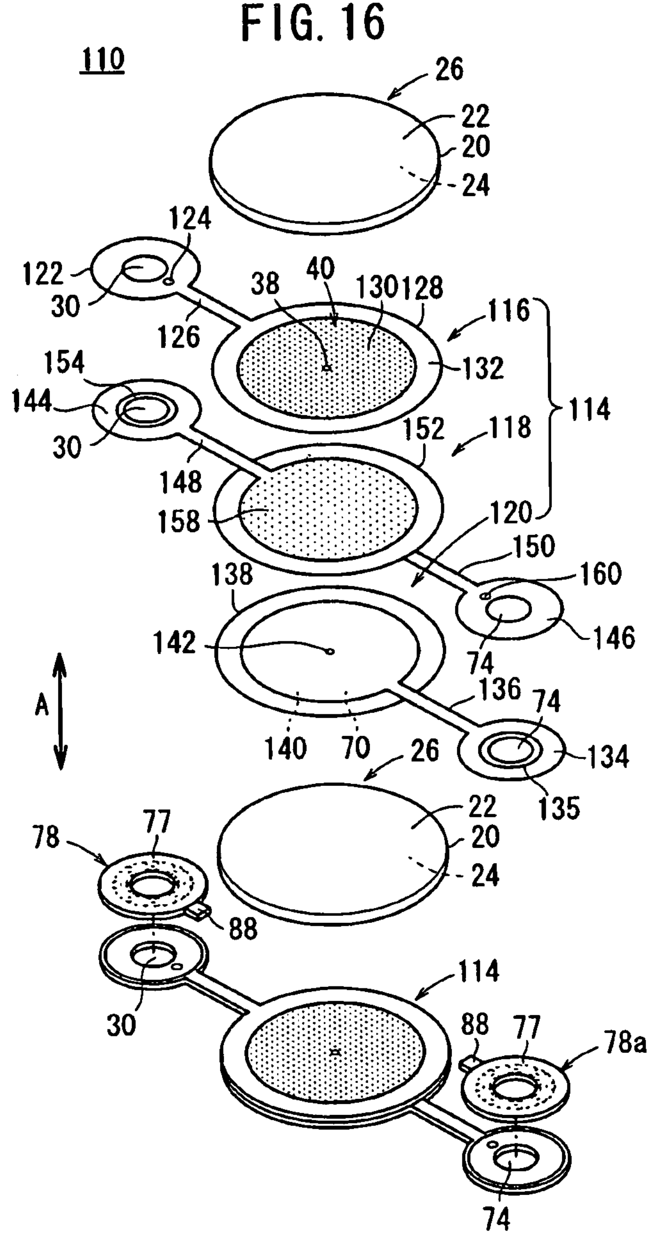
FIG. 16 is an exploded perspective view showing the fuel cell.

FIG. 15 is a perspective view schematically showing a fuel cell stack 112 formed by stacking a plurality of fuel cells 110 according to a fifth embodiment in a direction indicated by an arrow A. FIG. 16 is an exploded perspective view showing the fuel cell 110.

The fuel cell 110 is formed by sandwiching an electrolyte electrode assembly 26 between a pair of separators 114. Each of the separators 114 includes first, second, and third plates 116, 118, 120 which are stacked together. The first to third plates 116, 118, and 120 are, e.g., metal plates of stainless alloy or the like. For example, the first plate 116 and the third plate 120 are joined to both surfaces of the second plate 118, e.g., brazing, by diffusion bonding or laser welding.

Figure 17:
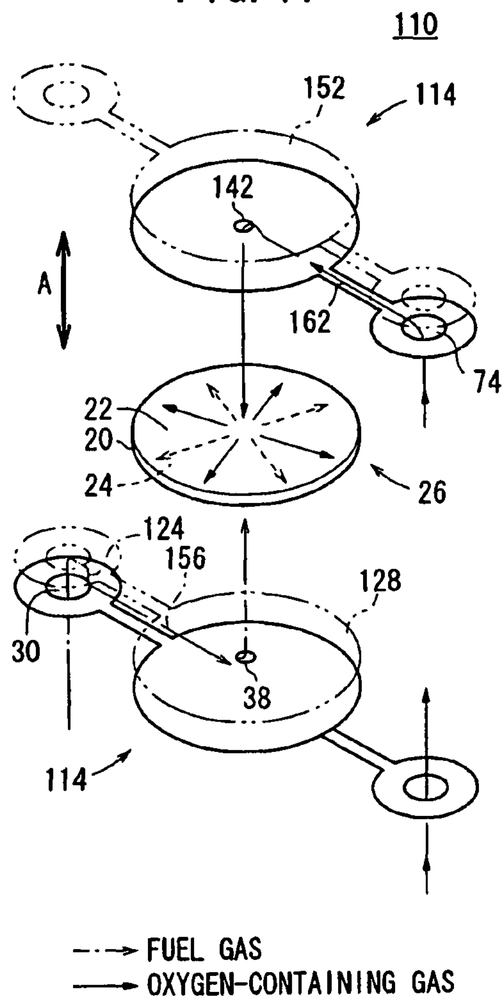
FIG. 17 is a partial exploded perspective view showing gas flows in the fuel cell.

As shown in FIGS. 16 and 17, the first plate 116 has a first fuel gas supply unit 122. A fuel gas supply passage 30 for supplying a fuel gas in the stacking direction indicated by the arrow A extends through the first fuel gas supply unit 122. A single hole 124 is formed in the first fuel gas supply unit 122. The hole 124 is provided at a position spaced from the fuel gas supply passage 30 toward the fuel gas channel 40. The first fuel gas supply unit 122 is integral with a first sandwiching section 128 having a relatively large diameter through a narrow bridge 126. The first sandwiching section 128 and the anode 24 of the electrolyte electrode assembly 26 have substantially the same size.

A large number of first protrusions 130 forming the fuel gas channel 40 are formed on a surface of the first sandwiching section 128 which contacts the anode 24, in a central region inside an outer circumferential region. A substantially ring shaped protrusion 132 is provided on the outer circumferential region of the first sandwiching section 128. The first protrusions 130 and the substantially ring shaped protrusion 132 jointly function as a current collector.

A fuel gas inlet 38 is provided at the center of the first sandwiching section 128 for supplying the fuel gas toward substantially the central region of the anode 24. The first protrusions 130 may be formed by making a plurality of recesses in a surface which is in the same plane with the surface of the substantially ring shaped protrusion 132.

The third plate 120 has a first oxygen-containing gas supply unit 134, and an oxygen-containing gas supply passage 74 for supplying the oxygen-containing gas in the stacking direction indicated by the arrow A extends through the first oxygen-containing gas supply unit 134. A ring shaped protrusion 135 is formed around the oxygen-containing gas supply passage 74. The first oxygen-containing gas supply unit 134 is integral with a second sandwiching section 138 having a relatively large diameter through a narrow bridge 136.

Figure 18:
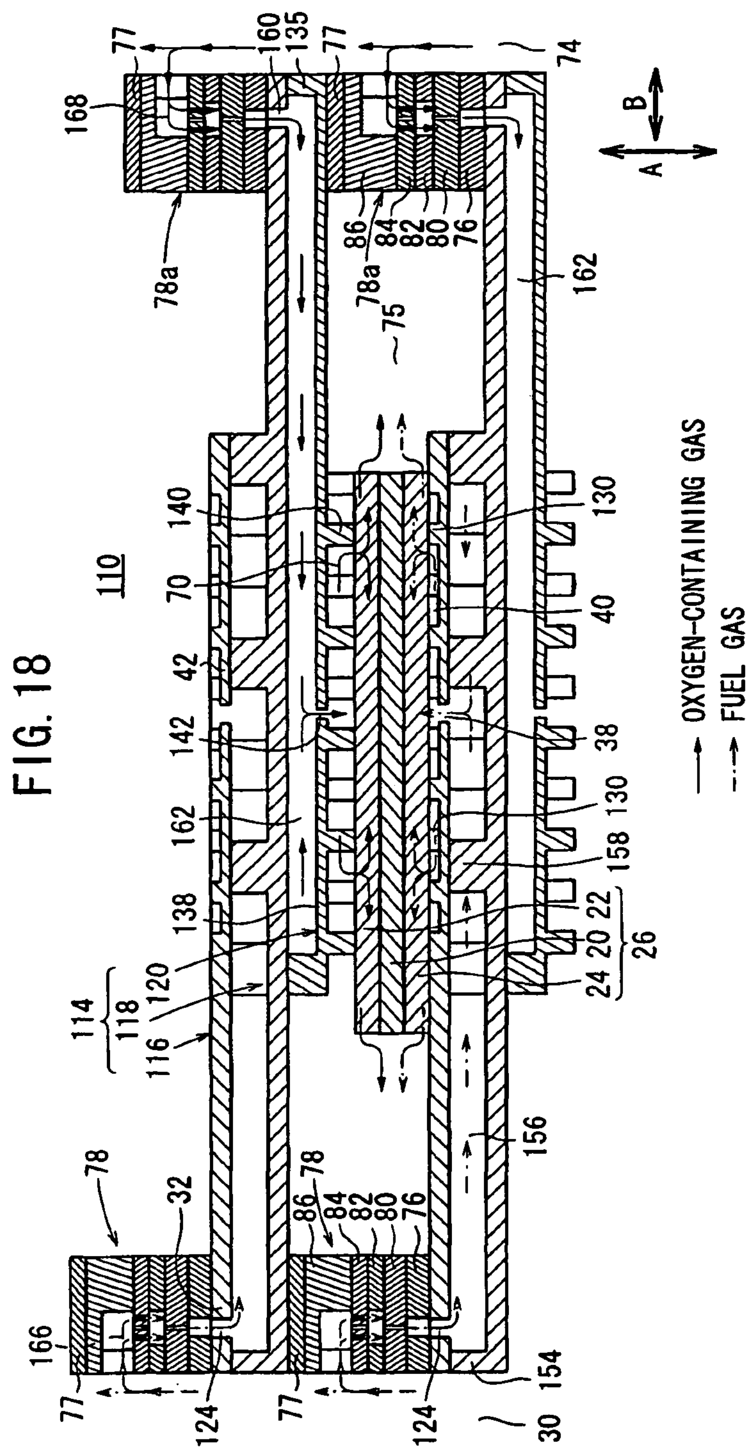
FIG. 18 is a cross sectional view showing operation of the fuel cell.

A plurality of second protrusions 140 forming the oxygen-containing gas channel 70 are formed over the entire surface of the second sandwiching section 138 which contacts the cathode 22 of the electrolyte electrode assembly 26 (see FIG. 18). The second protrusions 140 functions as a current collector. An oxygen-containing gas inlet 142 for supplying the oxygen-containing gas toward substantially the central region of the cathode 22 is formed at the center of the second sandwiching section 138.

As shown in FIG. 16, the second plate 118 has a second fuel gas supply unit 144 and a second oxygen-containing gas supply unit 146. The fuel gas supply passage 30 extends through the second fuel gas supply unit 144, and the oxygen-containing gas supply passage 74 extends through the second oxygen-containing gas supply unit 146. The second fuel gas supply unit 144 and the second oxygen-containing gas supply unit 146 are integral with the third sandwiching section 152 having a relatively large diameter through narrow bridges 148, 150. The diameter of the third sandwiching section 152 is the same as the diameters of the first and second sandwiching sections 128, 138.

A ring shaped protrusion 154 is formed in the second fuel gas supply unit 144 around the fuel gas supply passage 30. A fuel gas supply channel 156 connected to the fuel gas inlet 38 is formed between the bridges 126, 148 (see FIG. 18). A plurality of third protrusions 158 are formed in the third sandwiching section 152. The third protrusions 158 form part of the fuel gas supply channel 156.

A single hole 160 is formed in the second oxygen-containing gas supply unit 146. The hole 160 is provided at a position spaced from the oxygen-containing gas supply passage 74 toward the oxygen-containing gas channel 70. An oxygen-containing gas supply channel 162 connected to the oxygen-containing gas inlet 142 is formed between the bridges 136, 150 (see FIG. 18).

The first plate 116 is joined to one surface of the second plate 118 by brazing to form a fuel gas supply channel 156 connected to the fuel gas channel 40 between the first and second plates 116, 118. Likewise, the second plate 118 is joined to the third plate 120 by brazing to form the oxygen-containing gas supply channel 162 connected to the oxygen-containing gas channel 70 between the second and third plates 118, 120.

The flow path member 78 is detachably provided between the separators 28 around the fuel gas supply passage 30, and a flow path member 78*a* is detachably provided between the separators 28 around the oxygen-containing gas supply passage 74. The structure of the flow path member 78*a* is the same as the structure of the flow path member 78, and detailed description about the flow path member 78*a* is omitted.

As shown in FIG. 15, the fuel cell stack 112 includes end plates 170*a*, 170*b* at opposite ends of the fuel cells 110 in the stacking direction. A first pipe 172 and a second pipe 174 are provided at the end plate 170*a*. The first pipe 172 is connected to the fuel gas supply passage 30, and the second pipe 174 is connected to the oxygen-containing gas supply passage 74, of the fuel cells 110. Components between the end plates 170*a*, 170*b* are tightened together by tightening bolts 176. The end plate 170*a* or the end plate 170*b* is electrically insulated from the tightening bolts 176.

Operation of the fuel cell stack 112 will be described below.

The fuel gas such as the hydrogen-containing gas is supplied from the first pipe 172 connected to the end plate 170*a* and the oxygen-containing gas (hereinafter also referred to as the air) is supplied from the second pipe 174 connected to the end plate 170*a* (see FIG. 15).

As shown in FIG. 18, the fuel gas supplied to the fuel gas supply passage 30 flows in the stacking direction indicated by the arrow A, and is branched into the flow path member 78 of each fuel cell 110. Then, the fuel gas is supplied to the fuel gas supply channel 156 through the hole 124. The fuel gas flows from the fuel gas inlet 38 connected to the fuel gas supply channel 156, to the fuel gas channel 40.

The oxygen-containing gas supplied to the oxygen-containing gas supply passage 74 flows in the stacking direction, and the oxygen-containing gas is branched into the flow path member 78*a* of each fuel cell 110. The oxygen-containing gas flows through the hole 160, and then, the oxygen-containing gas is supplied to the oxygen-containing gas supply channel 162. The oxygen-containing gas flows into the oxygen-containing gas inlet 142 connected to the oxygen-containing gas supply channel 162, to the oxygen-containing gas channel 70.

Thus, in each of the electrolyte electrode assemblies 26, the fuel gas is supplied from the central region to the outer circumferential region of the anode 24, and the oxygen-containing gas is supplied from the central region to the outer circumferential region of the cathode 22 for generating electricity. The fuel gas and the oxygen-containing gas after consumption in the power generation is discharged as an exhaust gas from the outer circumferential regions of the first to third sandwiching sections 128, 152, and 138, and flows into the exhaust gas channel 75.

In the fifth embodiment, as shown in FIG. 18, the oxygen-containing gas flowing through the oxygen-containing gas supply passage 74 partially flows inside the flow path member 78*a*, and is supplied to the oxygen-containing gas supply channel 162. As in the case of the flow path member 78, the flow path member 78*a* is formed by fixing the orifice section 80, the pressure regulating section 82, the filter section 84, and the distribution section 86 together integrally.

In the structure, the pressure loss of the oxygen-containing gas from the oxygen-containing gas supply passage 74 to the oxygen-containing gas supply channel 162 is larger than the pressure loss of the oxygen-containing gas in the oxygen-containing gas supply passage 74.

Further, it is possible to remove foreign materials such as dust or the like through the filter section 84, and clogging in the channel grooves or holes connected to the oxygen-containing gas channel 70 from the oxygen-containing gas supply channel 162 is prevented.

Further, the flow path member 78*a* is detachably provided between the insulating seals 76, 77. Clogging of the orifice section 80 or clogging of the filter section 84 is eliminated simply by replacing the flow path member 78*a*. Thus, the same advantages as in the case of the first embodiment can be obtained.

Figure 19:
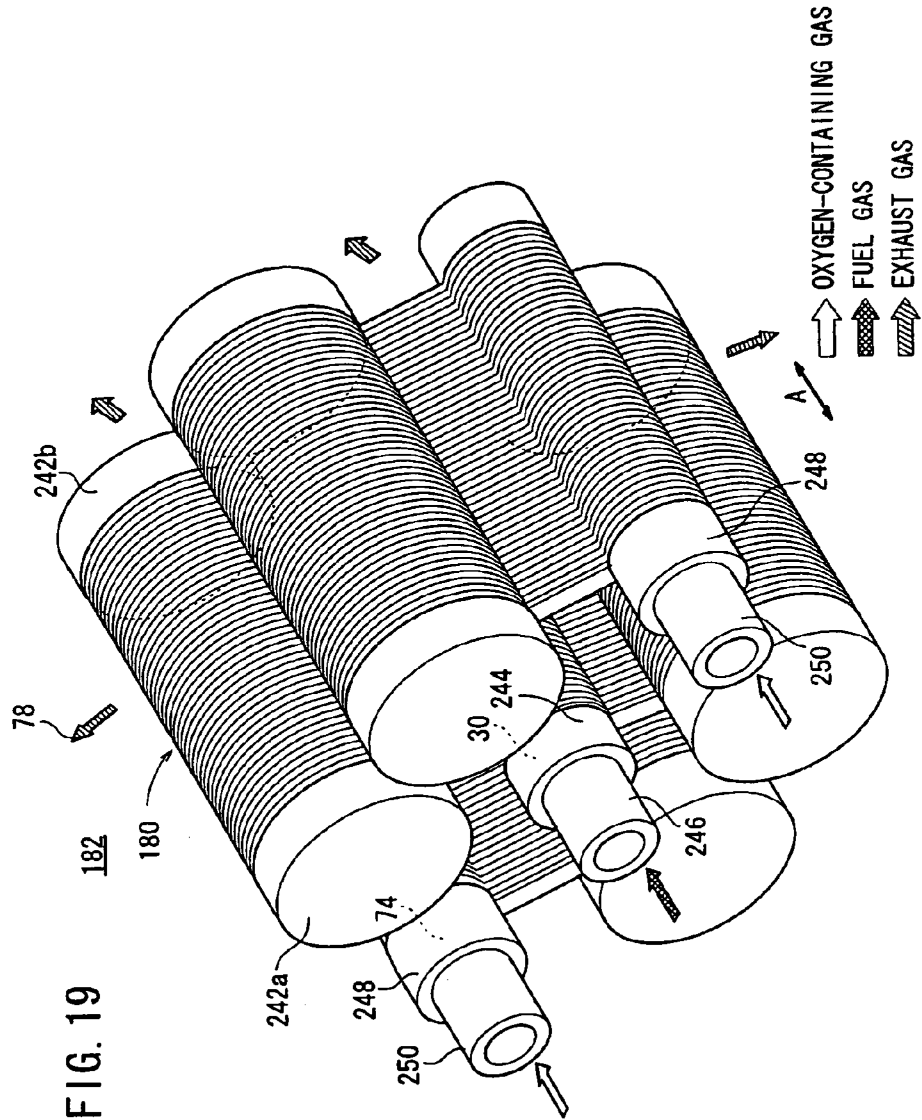
FIG. 19 is a cross sectional view schematically showing a fuel cell stack formed by stacking fuel cells according to a sixth embodiment of the present invention.
Figure 20:
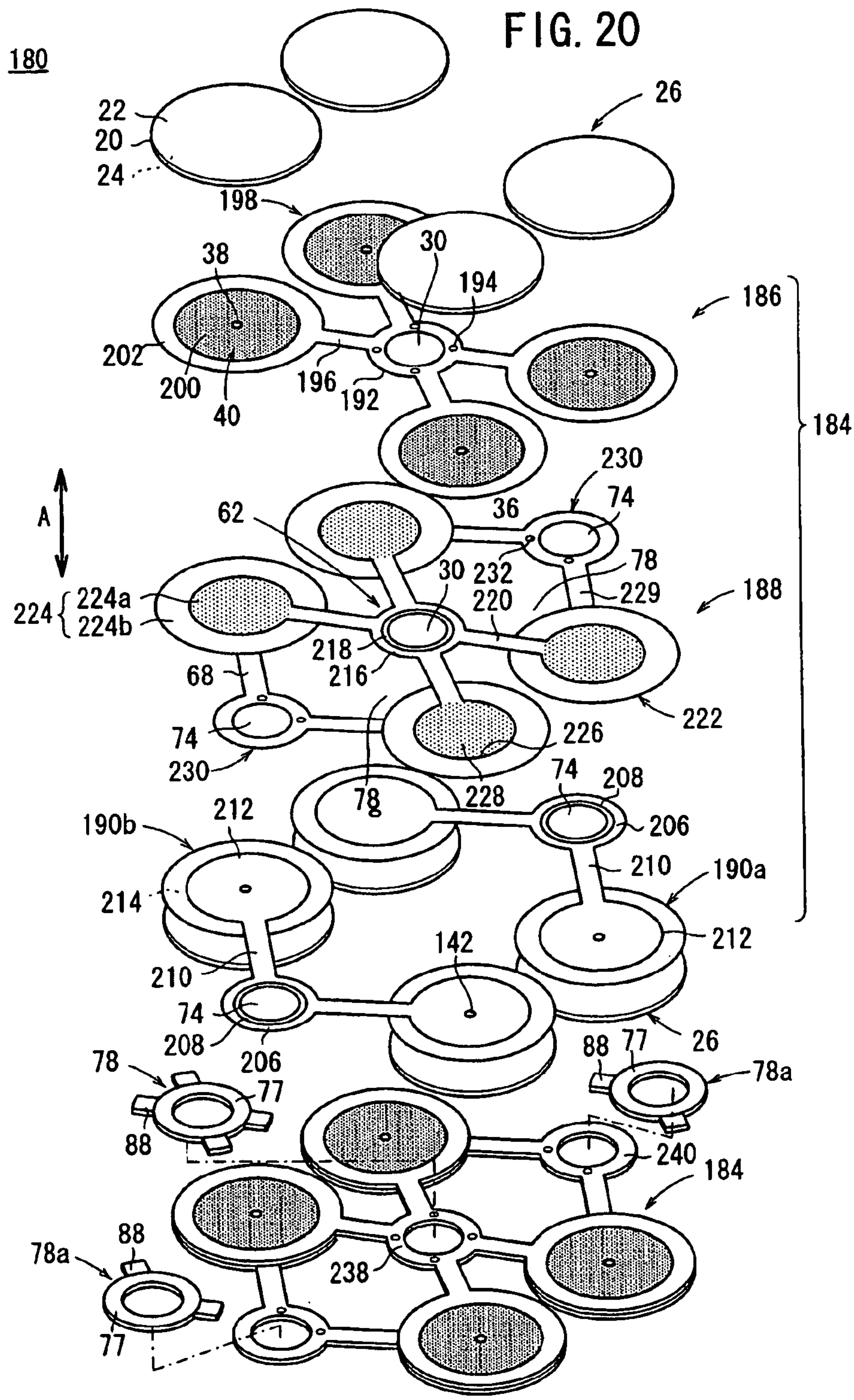
FIG. 20 is an exploded perspective view showing the fuel cell.

FIG. 19 is a perspective view schematically showing a fuel cell stack 182 formed by stacking a plurality of fuel cells 180 according to a sixth embodiment of the present invention indicated by the arrow A. FIG. 20 is an exploded perspective view showing the fuel cell 180.

As shown in FIG. 20, the fuel cell 180 is formed by sandwiching four electrolyte electrode assemblies 26 between a pair of separators 184. The separators 184 includes a first plate 186, a second plate 188, and a pair of third plates 190*a*, 190*b*. For example, the first to third plates 186, 188, 190*a*, 190*b* are metal plates of stainless alloy, and the first plate 186 and the third plates 190*a*, 190*b* are joined to both surfaces of the second plate 188 by blazing, diffusion bonding or laser welding.

The first plate 186 has a first fuel gas supply unit 192, and a fuel gas supply passage 30 extends through the first fuel gas supply unit 192. Four holes 194 are formed in the first fuel gas supply unit 192, around the fuel gas supply passage 30. The first fuel gas supply unit 192 is integral with four first sandwiching sections 198 through four narrow bridges 196.

A large number of first protrusions 200 are formed on a surface of the first sandwiching section 198 which contacts the anode 24, in a central region inside an outer circumferential region. A substantially ring shaped protrusion 202 is provided on the outer circumferential region of the first sandwiching section 198. The first protrusions 200 and the substantially ring shaped protrusion 202 jointly function as a current collector. A fuel gas inlet 38 is provided at the center of the first sandwiching section 198 for supplying the fuel gas toward substantially the central region of the anode 24.

Each of the third plates 190*a*, 190*b* has a first oxygen-containing gas supply unit 206, and an oxygen-containing gas supply passage 74 extends through the first oxygen-containing gas supply unit 206. A ring shaped protrusion 208 is provided in each of the first oxygen-containing gas supply unit 206, around the oxygen-containing gas supply passage 74. The first oxygen-containing gas supply unit 206 is integral with the two second sandwiching sections 212 each having a relatively large diameter through two bridges 210.

Figure 21:
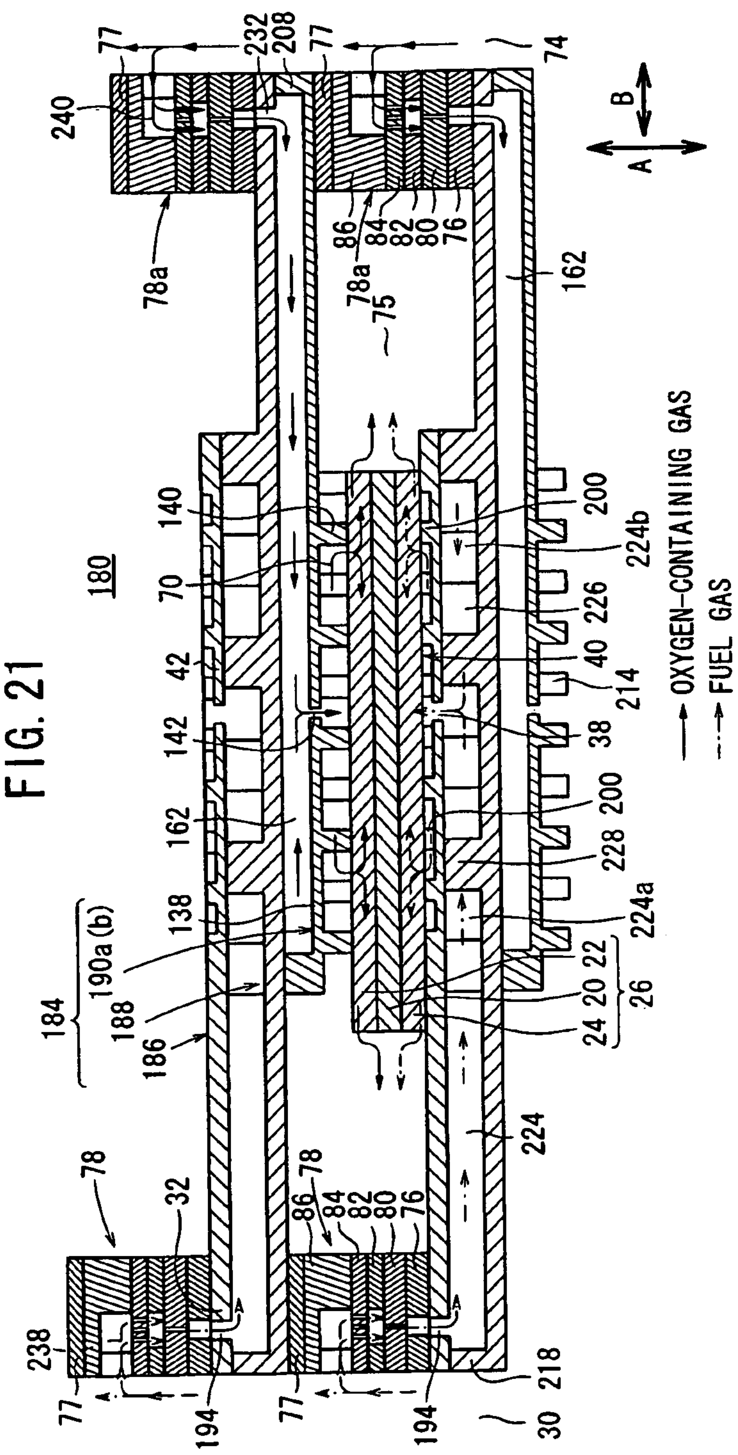
FIG. 21 is a cross sectional view schematically showing operation of the fuel cell.
Figure 22:
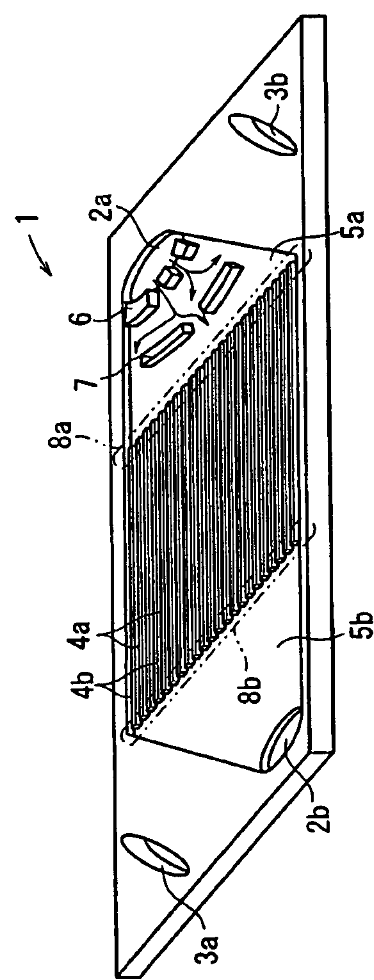
FIG. 22 is a view showing a separator of a conventional flat type solid oxide fuel cell.

As shown in FIG. 21, a plurality of second protrusions 214 are formed over the entire surface facing the cathode 22 of the electrolyte electrode assembly 26. The second protrusions 214 function as a current collector. An oxygen-containing gas inlet 142 is formed at the center of the second sandwiching section 212 for supplying oxygen-containing gas to the substantially central region of the cathode 22.

The second plate 188 has a second fuel gas supply unit 216, and the fuel gas supply passage 30 extends through the second fuel gas supply unit 216. A ring shaped protrusion 218 is formed in the second fuel gas supply unit 216, around the fuel gas supply passage 30. The second fuel gas supply unit 216 is integral with four third sandwiching sections 222 each having a relatively large diameter through narrow four bridges 220.

Each of the third sandwiching sections 222 has a fuel gas supply channel 224, and the fuel gas supply channel 224 is divided into first and second fuel gas supply channel units 224*a*, 224*b* through a partition 226 of a substantially ring-shaped protrusion. A plurality of third protrusions 228 are provided in the surface of the third sandwiching section 222, inside the partition 226.

The third sandwiching sections 222 are integral with two oxygen-containing gas supply unit 230 through two narrow bridges 229. Two holes 232 are formed in the second oxygen-containing gas supply units 230, around the oxygen-containing gas supply passage 74.

A flow path member 78 is detachably provided between the separators 184, around the fuel gas supply passage 30, and a flow path member 78*a* is detachably provided between the separators 184, around the oxygen-containing gas supply passage 74.

As shown in FIG. 19, the fuel cell stack 182 includes four end plates 242*a*, 242*b*, provided at each of opposite ends of the fuel cells 180 in the stacking direction. Plates 244 are provided at opposite ends of the fuel gas supply passage 30 in the direction indicated by the arrow A. The first pipe 246 for supplying the fuel gas to the fuel gas supply passage 30 is connected to the plates 244.

Two plates 248 are provided at each of opposite ends of the oxygen-containing gas supply channel 74 in the direction indicated by the arrow A. Each of the plates 248 is connected to the second pipe 250 for supplying the air to the oxygen-containing gas supply passage 74. The plates 244 and the plates 248 at opposite ends in the direction indicated by the arrow A are fixed by tightening bolts (not shown).

In the sixth embodiment, as shown in FIG. 19, the fuel gas is supplied to the fuel gas supply passage 30 in the fuel cell stack 182 through the first pipe 246, and the air is supplied to the oxygen-containing gas supply passage 74 in the fuel cell stack 182 through the respective second pipes 250.

As shown in FIG. 21, the fuel gas supplied to the fuel gas supply passage 30 flows in the stacking direction, and then, the fuel gas is branched into the flow path member 78 between the separators 184 of each fuel cell 180. Then, the fuel gas flows through the holes 194, and flows into each of the first fuel gas supply channel unit 224*a*. The fuel gas is supplied to the first fuel gas supply channel unit 224*a* along each fuel gas supply channel 224.

Thus, the fuel gas supplied to the first fuel gas supply channel unit 224*a* flows from the each fuel gas inlet 38 to the substantially central position of the anode 24 of each of the electrolyte electrode assembly 26.

The air supplied to the two oxygen-containing gas supply passage 74 is branched into the flow path member 78*a* between the separators 184. Then, the air flows through the hole 232, and flows along the oxygen-containing gas supply channel 162. Then, the air is supplied to the central region of the cathode 22 of each of the electrolyte electrode assemblies 26 from the oxygen-containing gas inlet 142 provided at the center of the second sandwiching section 212.

In the sixth embodiment, the same advantages as in the cases of the first to fifth embodiments can be obtained.

The invention claimed is:

1. A fuel cell formed by stacking an electrolyte electrode assembly and separators, said electrolyte electrode assembly comprising an anode, a cathode, and an electrolyte interposed between said anode and said cathode, said electrolyte electrode assembly being sandwiched between said separators, said separators each comprising:

a sandwiching section having a fuel gas channel for supplying a fuel gas along an electrode surface of said anode and an oxygen-containing gas channel for supplying an oxygen-containing gas along an electrode surface of said cathode, separately;

a bridge connected to said sandwiching section, and having a reactant gas supply channel for supplying the fuel gas to said fuel gas channel or supplying the oxygen-containing gas to said oxygen-containing gas channel; and a reactant gas supply unit connected to said bridge, a reactant gas supply passage for supplying the fuel gas or the oxygen-containing gas to said reactant gas supply channel extending through said reactant gas supply unit in a stacking direction, wherein a flow path member is detachably provided at said reactant gas supply unit via a seal member which seals the reactant gas supply unit, the seal member including a first seal and a second seal, the flow path member detachably provided between the first seal and second seal; and said flow path member includes an orifice section having orifice holes for reducing a flow rate of the fuel gas or the oxygen-containing gas supplied from said reactant gas supply passage to said reactant gas supply channel, the flow path member being provided between the separators sandwiching the electrolyte electrode assembly.

2. A fuel cell according to claim 1, wherein said flow path member includes a filter section having filter holes for filtering the fuel gas or the oxygen-containing gas supplied from said reactant gas supply passage to said reactant gas supply channel.

3. A fuel cell according to claim 2, wherein said filter section is provided on the upstream side of said orifice section in the flow direction of the fuel gas or the oxygen-containing gas.

4. A fuel cell according to claim 2, wherein an inner diameter of said orifice hole is larger than an inner diameter of said filter hole.

5. A fuel cell according to claim 2, wherein the number of said orifice holes is smaller than the number of said filter holes.

6. A fuel cell according to claim 2, wherein said flow path member includes a pressure regulating section between said filter section and said orifice section, said pressure regulating section having a pressure regulating chamber for regulating a pressure of the fuel gas or the oxygen-containing gas.

7. A fuel cell according to claim 2, wherein said flow path member includes a distribution section having a distribution groove supplied for distributing the fuel gas or the oxygen-containing gas from said reactant gas supply passage to said orifice section or said filter section.

8. A fuel cell according to claim 1, wherein said flow path member has an extension for positioning said flow path member relative to said reactant gas supply unit.

9. A fuel cell according to claim 1, wherein in each of said separators, a plurality of said sandwiching sections are connected to said reactant gas supply unit through a plurality of said bridges; and distances between a center of said reactant gas supply unit and centers of said sandwiching sections are the same.

10. A fuel cell according to claim 9, wherein the number of said orifice holes is determined in correspondence with the number of said electrolyte electrode assemblies sandwiched between said sandwiching sections.

11. A fuel cell according to claim 8, wherein the number of said extensions is determined in correspondence with the number of said electrolyte electrode assemblies sandwiched between said sandwiching sections.

12. A fuel cell according to claim 1 wherein the seal member is an insulating seal which seals the reactant gas supply unit and insulates the separators from each other.

13. The fuel cell of claim 1 wherein the seal member surrounds the reactant gas supply channel.

14. A fuel cell formed by stacking an electrolyte electrode assembly and separators, said electrolyte electrode assembly comprising an anode, a cathode, and an electrolyte interposed between said anode and said cathode, said electrolyte electrode assembly being sandwiched between said separators, said separators each comprising:

a sandwiching section having a fuel gas channel for supplying a fuel gas along an electrode surface of said anode and an oxygen-containing gas channel for supplying an oxygen-containing gas along an electrode surface of said cathode separately;

a bridge connected to said sandwiching section, and having a reactant gas supply channel for supplying the fuel gas to said fuel gas channel or supplying the oxygen-containing gas to said oxygen-containing gas channel; and a reactant gas supply unit connected to said bridge, a reactant gas supply passage for supplying the fuel gas or the oxygen-containing gas to said reactant gas supply channel extending through said reactant gas supply unit in a stacking direction, wherein a flow path member is detachably provided at said reactant gas supply unit; via a seal member which seals the reactant gas supply unit, the seal member including a first seal and a second seal, the flow path member detachably provided between the first seal and second seal; and said flow path member includes a filter section having filter holes for filtering the fuel gas or the oxygen-containing gas supplied from said reactant gas supply passage to said reactant gas supply channel, the flow path member being provided between the separators sandwiching the electrolyte electrode assembly.

15. A fuel cell according to claim 14, wherein said flow path member includes an orifice section having orifice holes for reducing a flow rate of the fuel gas or the oxygen-containing gas supplied from said reactant gas supply passage to said reactant gas supply channel.

16. A fuel cell according to claim 15, wherein said filter section is provided on the upstream side of said orifice section in the flow direction of the fuel gas or the oxygen-containing gas.

17. A fuel cell according to claim 15, wherein an inner diameter of said orifice hole is larger than an inner diameter of said filter hole.

18. A fuel cell according to claim 15, wherein the number of said orifice holes is smaller than the number of said filter holes.

19. A fuel cell according to claim 15, wherein said flow path member includes a pressure regulating section between said filter section and said orifice section, said pressure regulating section having a pressure regulating chamber for regulating a pressure of the fuel gas or the oxygen-containing gas.

20. A fuel cell according to claim 15, wherein said flow path member includes a distribution section having a distribution groove supplied for distributing the fuel gas or the oxygen-containing gas from said reactant gas supply passage to said orifice section or said filter section.

21. A fuel cell according to claim 14, wherein said flow path member has an extension for positioning said flow path member relative to said reactant gas supply unit.

22. A fuel cell according to claim 14, wherein in each of said separators, a plurality of said sandwiching sections are connected to said reactant gas supply unit through a plurality of said bridges; and distances between a center of said reactant gas supply unit and centers of said sandwiching sections are the same.

23. A fuel cell according to claim 14 wherein the seal member is an insulating seal which seals the reactant gas supply unit and insulates the separators from each other.

24. The fuel cell of claim 14 wherein the seal member surrounds the reactant gas supply channel.

* * * * *